FIG. I

INVENTORS.
DAVID L. BAHRS
JOHN F. COULEUR
PHILIP F. GUDENSCHWAGER
RICHARD L. RUTH
WILLIAM A. SHELLY

BY

ATTORNEY

United States Patent Office 3,425,039
Patented Jan. 28, 1969

3,425,039
DATA PROCESSING SYSTEM EMPLOYING
INDIRECT CHARACTER ADDRESSING
CAPABILITY
David L. Bahrs, Liverpool, N.Y., John F. Couleur, Phoenix, Philip F. Gudenschwager, Scottsdale, and Richard L. Ruth and William A. Shelly, Phoenix, Ariz., assignors to General Electric Company, a corporation of New York
Filed June 27, 1966, Ser. No. 560,572
U.S. Cl. 340—172.5            12 Claims
Int. Cl. G11b 13/00

ABSTRACT OF THE DISCLOSURE

A data processing system including a data processor and a memory unit is shown. The processor includes means for providing several different types of address modifications.

INTRODUCTION

This invention relates generally to data processing systems and, more particularly, to means for providing memory addresses in a data processing system.

In a data processing system which executes a sequence of instruction words called a program to process data, it is often desirable to provide the capability of what is generally referred to as indirect addressing. More correctly, it is desirable to provide for address modification which includes indirect addressing. In address modification, an instruction word, which normally includes an address portion as well as additional data concerning an operation to be performed, is operatively employed with a second type of information item termed an indirect word. These two words, the instruction word and the indirect word, collectively define the total of an operation to be performed with respect to an information item stored in the memory. This latter information item is normally called an operand.

Address modification permits versatility and flexibility in establishing programs for a data processing system and greatly eases the problems of the programmer. Address modification also facilitates the use of certain fundamental concepts by more than one programmer without the inclusion of a great number of details in each of the programs. Additionally, certain types of address modifications permit the traversal of tables (a series of storage locations) by the execution of a single command without the necessity of programmer supervision of each individual step to thus permit what amounts to an automatic search for a specific detail or information item.

Without address modification it is necessary for the programmer to use what is sometimes termed an impure procedure. In an impure procedure, the programmer must modify each instruction used. This prohibits, in a multiprocessor system, the use of a single instruction by more than one program. Thus, an impure procedure does not represent an efficient method of programming. Additionally, by address modification and indirect addressing, a particular memory location may be preselected which will serve to point to a particular type of function and with this knowledge the programmer may proceed to write his program knowing that when he needs this particular type of function he need only reference this preselected location.

While address modification is fairly well developed in the art it has suffered from lack of versatility in the number of ways of developing addresses. Accordingly, it is desirable to extend the usefulness of address modification in a data processing system.

It is, therefore, an object of the present invention to provide an improved address modification apparatus in a data processing system.

It is another object of the invention to extend the address modification capability of a data processing system.

It is a still further object to provide a data processing system embodying new and improved means for address development.

Still another object is to provide a data processing system employing address modification apparatus to ensure greater versatility to the program.

It is a still further object of the present invention to provide a data processing system employing address modification apparatus which permits an operation defined by a first information item to be performed upon a portion of an operand defined by a second information item.

The foregoing objects are achieved, in accordance with the illustrated embodiment of the present invention by providing an instruction word which includes an address portion and an operation code portion. The address portion of this instruction word is utilized to obtain a second or indirect word which is brought from the memory unit to the data processing unit of the system. The indirect word includes an address portion which defines the memory unit storage location of an information item and a tag portion which defines a particular part of the information item. Upon the bringing of this information item from the memory, the operation specified by the operation code portion of the instruction word is performed upon the portion of the information item defined by the tag of the indirect word.

DRAWINGS

For a better understanding of the invention, reference is made to the accompanying drawings in which.

ADDRESS MODIFICATION

General

Before proceeding with a detailed explanation of the figures, a brief explanation of the manner in which this discussion will be presented is believed desirable. In the ensuing discussion of the figures, the heavier lines represent the paths of data (e.g., instructions) movement, including multiple line buses, as opposed to the use of lighter lines to represent control signal paths. Additionally, the logic utilized is meant to be representative of the function desired and is not to be limited to the specific logic shown. For example, in many situations an AND-gate may be shown having a data bus input and a control line input with the output of this gate being a data bus. Such symbology is to represent the gating of the information on the several lines of that bus by the action of that control signal.

A great number of the components shown throughout the drawings are in the form of blocks or similar symbology and these are used to represent logic configurations or components which are well-known in the art such as adders, registers, switches, decoding logic, etc. The details of these items which are considered well-known are not shown except where it is believed desirable for the purposes of more fully understanding the invention. Additionally, a certain number of logic configurations which are indirectly involved in the present application are shown only as blocks with a statement of their function. Further details involving these blocks and of the total system of which the present invention is a part may be found in copending patent application "Data Processing System Including Plural Memory Controllers," by David L. Bahrs, et al., Ser. No. 555,165 filed June 3, 1966 and assigned to the assignee of the present invention. It is also to be expressly understood that a system, of the complexity of which the present invention comprises a part, will have a large number of interrelated control signals which, while they are important to the functioning of the operation of the total system, do not play a direct, significant part in the operation of the present invention. Therefore, in order to present the instant invention in its simplest and most easily comprehensible form, these signals have been omitted and only those control signals which contribute directly to the functioning of the invention have been included.

Figure 1:
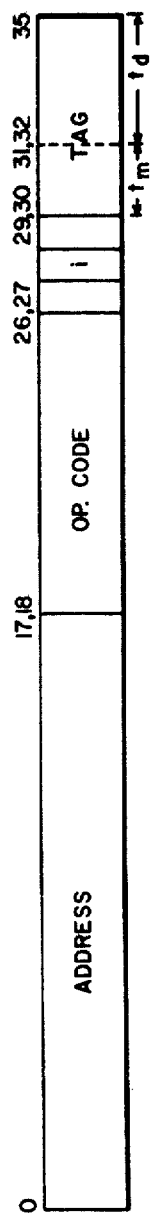
FIGURE 1 illustrates the format of a typical instruction word used in the present invention.

In the embodiment of the invention here utilized, for purposes of explanation, information items brought from memory; e.g., instruction words and data words, are thirty-six bit items. FIGURE 1 illustrates a typical instruction word. Referring now specifically to FIGURE 1 it is seen that the most significant half of the word, bits 0–17, contain the address of a particular location in the memory. The next nine bits, bits 18–26, comprise the operation code portion of the instruction word. It is this portion which designates the operation to be performed. Bits 27, 28, and 29 are not utilized in the presently being described invention. The last six bits, bits 30–35, collectively form what is known as the tag field or, more simply, the tag and it is this portion which directs the address modification and development techniques of the system of the present invention. The tag field is further divided into two parts, a $t_m$ part, bits 30–31, and a $t_d$ part, bits 32, 33, 34 and 35. As will be more fully explained hereinafter, the $t_m$ part specifies which of four types of address modification is to be utilized while the $t_d$ part, depending upon the type of modification, generally specifies the register to be used in the modification or indexing or, in a tallying type of modification, specifies the tallying procedure in detail.

Prior to the continuation of the description of the tag portion of the instruction word and its ramifications upon the operation of the system, it is believed beneficial to present a general description of data flow within the system and, more particularly, within the processor of the system which actually performs the address development or modification. This flow of data may best be seen with respect to FIGURE 2 which illustrates only the flow of data between a memory unit and the processor and, within the processor, between a major portion of the components which are utilized in the present invention. All components shown other than a memory unit 10 are a part of the processor. Memory unit 10 delivers information items in the form of thirty-six bit instruction words or data words via a thirty-six bit bus 12 to a ZDI switch 14. From the ZDI switch 14 incoming information items, hereinafter often collectively referred to as data, may be directed along one of three paths. The first of these paths is to an M-Register 16, a seventy-two bit register capable of holding two words. From the M-Register 16 incoming data or portions thereof may be directed to one of eight 18 bit Index Registers collectively designated by the reference character 18. The eight Index Registers are individually identified as $X_0$–$X_7$ and the incoming data to these registers is directed to the appropriate ones by means of an input IX switch 20. Data may also pass from the M-Register 16 to a seventy-two bit accumulator or AQ-Register 22. The AQ-Register is further defined as having an A portion 24, hereinafter referred to as the A-Register, and a Q portion 26, hereinafter referred to as the Q-Register.

The second path incoming data may take from the ZDI switch 14 is to a plurality of four registers 28 which are collectively known as the Instruction Registers. The Instruction Registers are comprised of four 18 bit registers, namely a YE-Register 30, a COE-Register 32, a YO-Register 34 and a COO-Register 36. As the name implies, the Instruction Registers 28 serve to hold the instructions grought from the memory unit 10. In the normal operation of the presently being described system, instruction words such as those illustrated in FIGURE 1 are brought from the memory unit 10 in pairs. Under suitable gating, the address portion of the first or even instruction of a pair is placed in a YE-Register 30 while the command portion of this even instruction (bits 18–35) is placed into the COE-Register 32. Similarly, the address portion of the odd instruction of a pair is placed into the YO-Register 34, while the command portion of the odd instruction is placed into the COO-Register 36.

The third path which data entering the processor via the ZDI switch 14 may follow is from the ZDI switch to a ZY switch 38 and from there, via bus 40, to a YS adder 42. The contents of the YE and YO-Registers are also selectively transferred via the ZY switch 38 and bus 40 to the YS adder 42. The YS adder is the control frame general purpose adder and is highly instrumental in the address modification operation to be subsequently described.

While the transfer of the YE and YO-Registers to the YS adder is the normal case, in certain situations to be subsequently described the contents of the YE and YO-Registers may be transferred via the ZY switch 38 to the M-Register 16.

The contents of the COE and COO-Registers are selectively transferred via a ZI switch 44 to one of several places. These contents may be transferred via the ZI switch to a block 46 designated as Command Logic or to a second block 48 designated as Zone Logic. The Command Logic decodes the operation code portion (bits 18–26) of the instruction word and transmits this information to the memory unit 10 to direct the operation of that unit. The Zone Logic is utilized to inform the memory unit 10, in certain circumstances, of the manner in which the memory unit is to process information as the system of the present invention possesses the capability of operating on characters or bytes of either six or nine bits. For a more complete understanding of the Command Logic and Zone Logic, reference is made to the aforementioned co-pending patent application, Ser. No. 555,165. The tag part of the contents of the COE or COO-Registers (bits 30–35) may be selectively transferred to one or both of two places. These bits may be transferred to one or both of two places. These bits may be transferred via the ZI switch 4 to a CT-Register 50 which serves to store the tag part of an instruction word during certain types of address modification. The tag part of the instruction word may also be transmitted to a Tag Decode Logic block 52 which includes sufficient circuitry to decode both the $t_m$ and the $t_d$ parts of the tag portion of the instruction word to direct the address modification as will be more fully explained with respect to FIGURE 3. The capability is also provided for the transfer of information from the CT-Register 50 to the Tag Decode Logic 52 via a bus 54.

Figure 2:
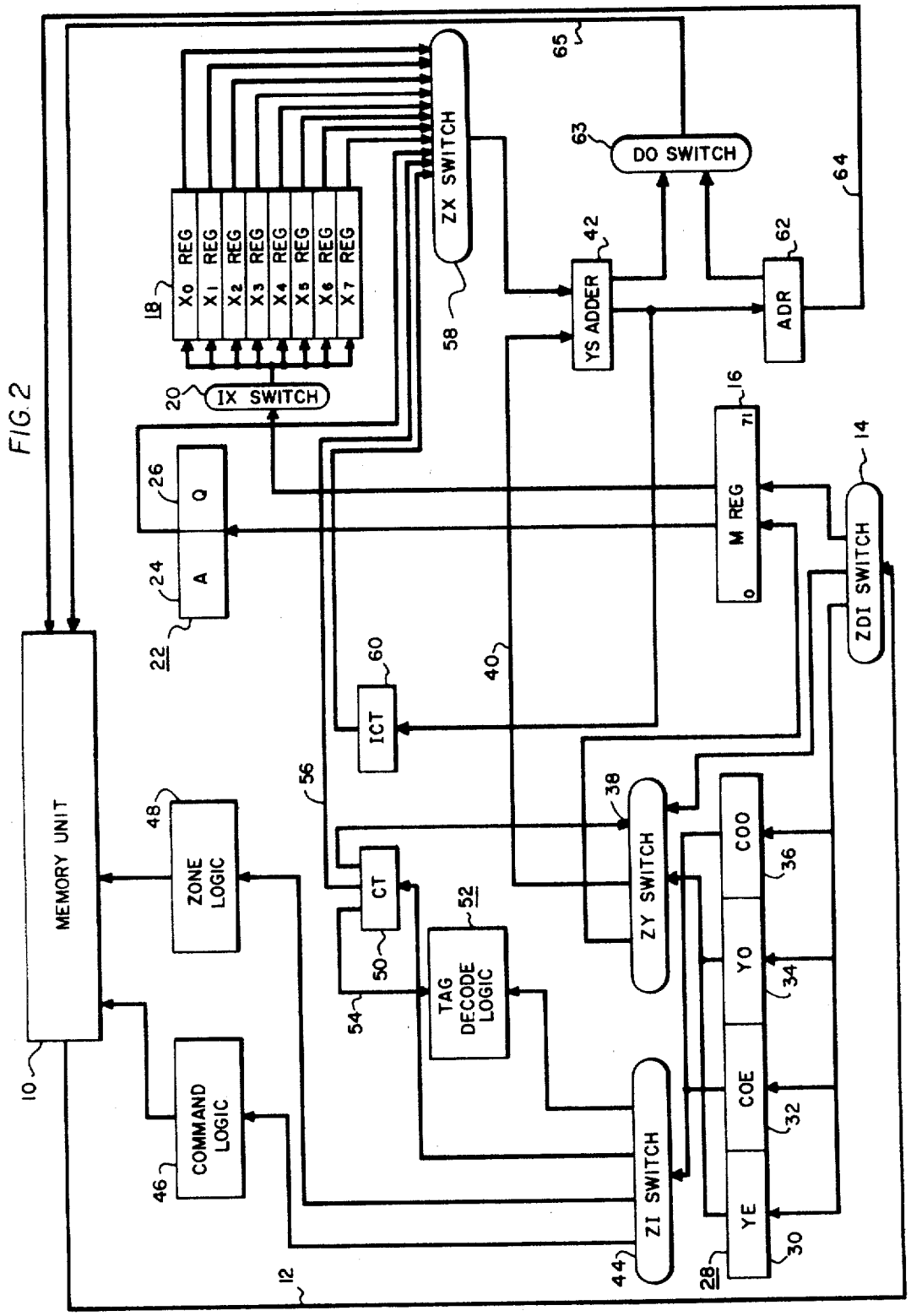
FIGURE 2 is a major block diagram illustrating the data paths in the system of the present invention.

In addition to that just described, and as shown in FIGURE 2, the contents of the CT-Register 50 may be transmitted via a bus 56 to a ZX switch 58. The ZX switch 58 has additional inputs from each of the Index Registers 18 ($X_0$–$X_7$) and from the AQ-Register 22. The last input to the ZX switch is from an ICT-Register 60. The ICT-Register 60 is an eighteen bit register which holds the address of the instruction presently being executed by the processor. The ICT-Register receives its input from the YS adder 42.

The output of the ZX switch 58 forms an input to the YS adder 42 and it is thus seen that the YS adder is capable of receiving data via the ZY switch, the ZX switch, the CT-Register 50 and the ICT-Register 60. The address modifications are performed in the YS adder and once an effective address (one which is to be used to retrieve a word from memory) has been formulated in the YS adder, it is transferred to an Address Register (ADR) 62. From the Address Register 62 the address is transferred via an address bus 64 to the memory unit 10 for the accessing of the location specified by that address.

The remaining showing of FIGURE 2 concerns a DO switch 63 which receives data from the YS adder 42 and the Address Register 62 and transmits this data to the memory unit 10 via a thirty-six line bus 65.

TAG FIELD

General

Referencing once again FIGURE 1, as was previously stated the tag field of a typical instruction word is comprised of six bits, bits 30–35. The tag is further divided into two parts, the $t_m$ part, bits 30–31, and the $t_d$ part, bits 30–35.

$t_m$.—The $t_m$ part of the tag, bits 30–31, designates which of four possible types of address modification or development is to be performed. The following table is a general characterization of each of the four modification types defined by the $t_m$ part, bits 30–31.

| $t_m$ | Bits 30–31 | Modification type |
|---|---|---|
| R | 00 | "Register"—Indexing according to $t_d$ as register designator and termination of the address modification procedure. |
| RI | 01 | "Register, then Indirect"—Indexing according to $t_d$ as register designator, then substitution and continuation of the modification procedure as directed by the tag of this indirect word. |
| IR | 11 | "Indirect, then Register"—Saving of $t_d$ as final register designator, then substitution and continuation of the modification procedure as directed by the tag of this indirect word. |
| IT | 10 | "Indirect, then Tally"—Substitution, then use of this indirect word according to $t_d$ as tally designator. |

$t_d$.—The $t_d$ part of the tag, bits 32–35, specifies further the action for each modification type. In the case of the modification types R, RI and IR, the $t_d$ part of the tag is called the "register designator" and normally specifies the register to be used in an indexing step. The following table lists the further action steps possible under one or more of the modifier types R, RI and IR.

| Bit | | | | Mnemonic | Meaning |
|---|---|---|---|---|---|
| 32 | 33 | 34 | 35 | | |
| 0 | 0 | 0 | 0 | N | No modification. |
| 0 | 0 | 0 | 1 | AU | A-register bits 0–17. |
| 0 | 0 | 1 | 0 | QU | Q-register bits 0–17. |
| 0 | 0 | 1 | 1 | DU | Direct upper. |
| 0 | 1 | 0 | 0 | ICT | Instruction counter. |
| 0 | 1 | 0 | 1 | AL | A-register bits 18–35. |
| 0 | 1 | 1 | 0 | QL | Q-register bits 18–35. |
| 0 | 1 | 1 | 1 | DL | Direct lower. |
| 1 | 0 | 0 | 0 | $X_0$ | X-register 0. |
| 1 | 0 | 0 | 1 | $X_1$ | X-register 1. |
| 1 | 0 | 1 | 0 | $X_2$ | X-register 2. |
| 1 | 0 | 1 | 1 | $X_3$ | X-register 3. |
| 1 | 1 | 0 | 0 | $X_4$ | X-register 4. |
| 1 | 1 | 0 | 1 | $X_5$ | X-register 5. |
| 1 | 1 | 1 | 0 | $X_6$ | X-register 6. |
| 1 | 1 | 1 | 1 | $X_7$ | X-register 7. |

From the above table it should be noted that there are three exceptions to the statement that the $t_d$ designates a register for indexing. These exceptions are the mnemonics N, DU and DL. In the case of N, no modification is effected and the address portion of the instruction word is the address used to obtain the operand. In the cases of DU and DL the address portion of the instruction word serves as the operand and will be placed, respectively, in the upper or lower half of the register specified by the instruction word. It should, however, be pointed out at this time that DU and DL are permissible only with the R modifier and are not permitted under RI or IR.

In the case of the IT modifier, the $t_d$ part of the tag is called the "tally designator" and usually specifies the tallying in detail. The modification type IT consists of a substitution and the use of this indirect word as specified by the $t_d$ part of the instruction or previous indirect word as tally designator. There are ten variations controlled by the $t_d$ part (bits 32–35) when the $t_m$ part is an IT modifier. These variations are shown in the table below.

| Bit | | | | Mnemonic | Meaning |
|---|---|---|---|---|---|
| 32 | 33 | 34 | 35 | | |
| 0 | 0 | 0 | 0 | F | Fault. |
| 1 | 0 | 0 | 0 | CI | Indirect byte (unmodified). |
| 1 | 0 | 0 | 1 | I | Indirect (unmodified). |
| 1 | 0 | 1 | 0 | SC | Sequence byte. |
| 1 | 0 | 1 | 1 | AD | Add delta. |
| 0 | 1 | 0 | 0 | SD | Subtract delta. |
| 1 | 1 | 0 | 0 | DI | Decrement address and increment tally. |
| 1 | 1 | 0 | 1 | DIC | Decrement address, increment tally, and continue. |
| 1 | 1 | 1 | 0 | IC | Increment address and decrement tally. |
| 1 | 1 | 1 | 1 | IDC | Increment address, decrement tally, and continue. |

As previously indicated, there are exceptions to the statement that the IT requires a tallying operation in that the variations F, CI and I do not involve tallying. This, however, will be explained in more detail subsequently in this description.

Figure 3:
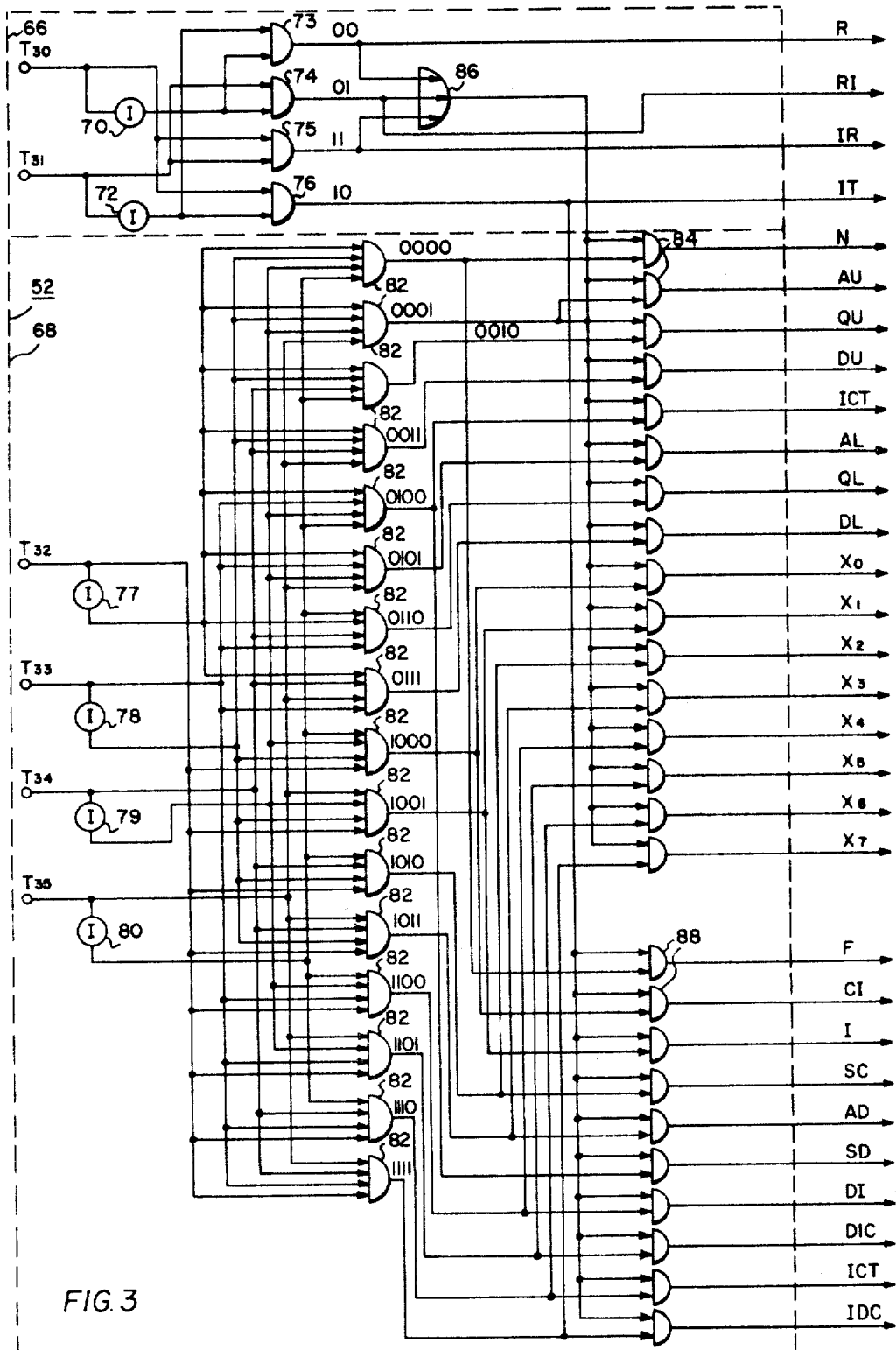
FIGURE 3 is a detailed schematic drawing of one of the components shown in FIGURE 2.

Tag field decoding.—As was stated with respect to FIGURE 2, the tag field of an instruction word (bits 30–35) is selectively gated from the appropriate COE-Register 32 or the COO-Register 36 through the ZI switch 44 to the Tag Decode Logic 52, the functional details of which may best be seen with respect to FIGURE 3. Referencing now FIGURE 3, it is seen that the Tag Decode Logic 52 may be considered as being divided into two parts as indicated by the dotted lines. These two parts are a $t_m$ decoding portion 66 and a $t_d$ decoding portion 68. There are six input terminals to the Tag Decode Logic 52, designated as T30–T35, to correspond respectively with bits 30–35 of the tag field of an instruction word.

Thus, the ZI switch 44 (FIGURE 2) directs bits 30–35 of the tag field to the respective terminals T30–T35 of the Tag Decode Logic 52 such that bits 30 and 31 are delivered to the $t_m$ decode portion 66 while bits 32–35 are delivered to respective terminals of the $t_d$ decode portion 68.

As shown in FIGURE 3, bit 30 connects to the terminal T30 of the $t_m$ decoding portion 66 while bit 31 connects to terminal T31. The signals thus presented by these bits at the two terminals are provided, either as presented or via two inverters 70 and 72, to the inputs of four AND-gates 73–76, inclusive. The outputs of the four AND-gates 73–76, represent, respectively, the signals R, RI, IR and IT. These flip-flop outputs form outputs of the Tag Decode Logic 52 and define or designate the type of modification which is to take place.

The respective input signals to the four terminals, T32–T35, of the $t_d$ decoding portion 68 are the four bits 32–35 of the tag portion of an instruction word. The signals at the terminals T32–T35 are provided either as presented or as the inversion of these signals, through a plurality of inverters 77–80, to a plurality of sixteen AND-gates 82 which collectively form a decoding matrix. The decoding matrix comprised of the AND-gates 82 is of a common type and provides that the output of one, and only one, of the AND-gates is high with a particular configuration of inputs to the terminals T32–T35. The output of each of the AND-gates 82 forms, respectively, one input to one of a group of 16 two-input AND-gates 84. The second input to each of these gates is from an OR-gate 86 which has as its inputs the three signals R, RI and IR. A second plurality of 10 two-input AND-gates 88 has as one input thereto the output of certain of the AND-gates 82. The second input to each of the AND-gates 88 is the IT signal from the $t_m$ decoding portion 66.

From the foregoing, it is readily seen that the outputs from the Tag Decode Logic 52 are comprised of the four signals R, RI, IR and IT, the sixteen signals from the AND-gates 84 which comprise the action steps which were previously set forth with respect to the modifiers R, RI and IR and the ten outputs from the ten AND-gates 88 which are the ten variations available in an IT type of modification.

Figure 4:
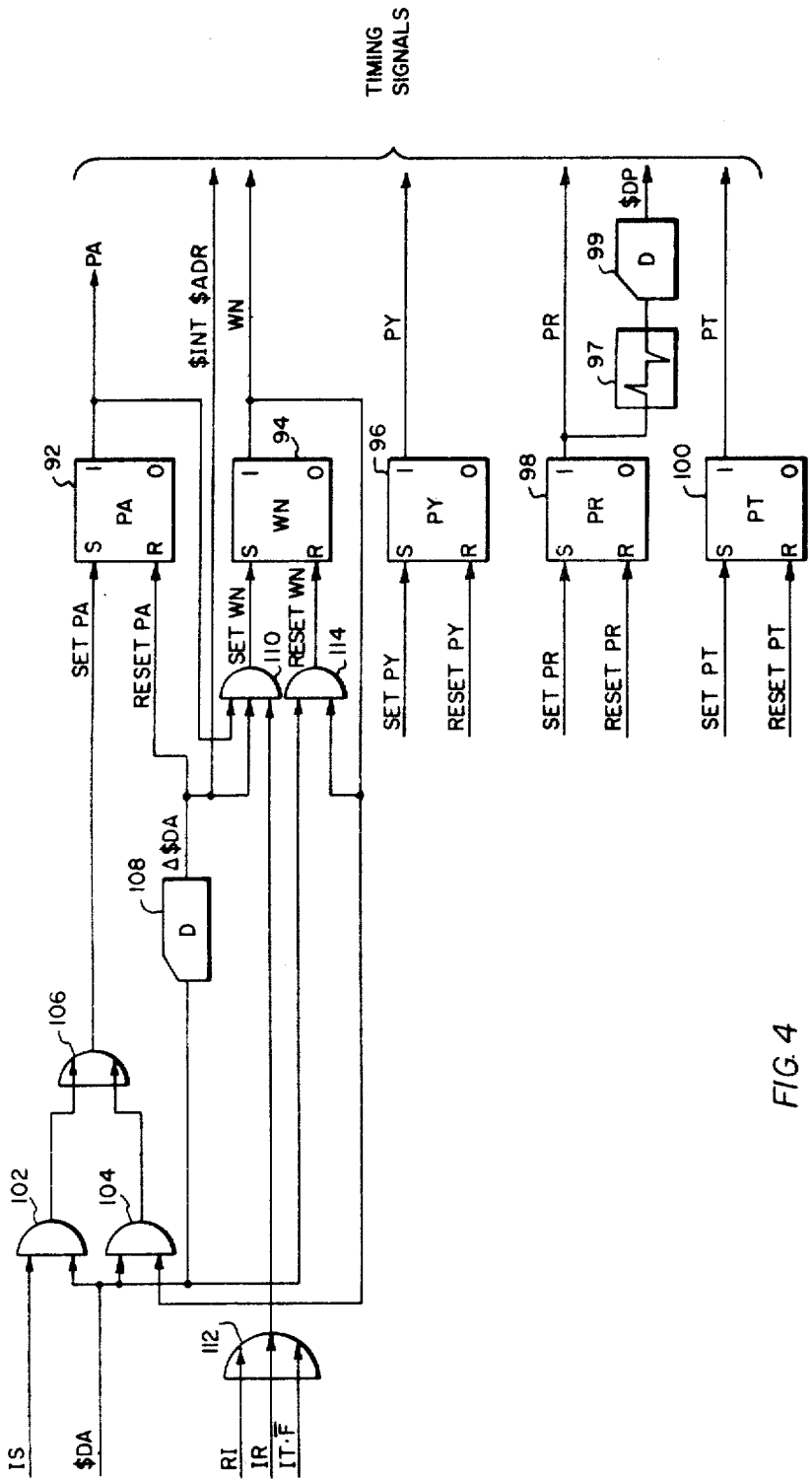
FIGURE 4 is a schematic drawing illustrating the manner in which the several timing signals used throughout the present invention are generated.

Timing.—Some means must be present for providing the basic timing periods in which the various functions occur in the address modification or development which is to be subsequently described. FIGURE 4 illustrates the manner in which the several necessary timing signals are derived. Referencing now specifically FIGURE 4, there are shown five flip-flops; a PA flip-flop 92, a WN flip-flop 94, a PY flip-flop 96, a PR flip-flop 98 and a PT flip-flop 100. The one output terminal of each of these flip-flops provides a timing signal, bearing the same designation as the flip-flop from whence it issues, which is used in one or more of the address modifications in a manner to be more fully described. Three additional timing signals, $INT, $ADR and $DP are also generated.

The PA signal from the PA flip-flop 92 denotes that the processor is preparing an address. The WN flip-flop output denotes that the processor is waiting for an indirect word to be brought from memory. The PY flip-flop output specifies that the processor is preparing a tally while the PR signal denotes that the processor is rewriting an IT indirect. The PT flip-flop signal denotes that the processor is preparing an address for an IT type of modification.

The PA flip-flop 92 is placed into its set state in one of two ways. The first of these ways is by the simultaneous application of a signal IS to one input of a two-input AND-gate 102 whose second input is a signal $DA. The signal IS is one generated by the processor to signify that the previous memory access was an instruction word. The $DA signal is sent to the processor by the memory unit and indicates that the data or information requested is available on the input bus to the processor or that the data sent to the memory unit for storage has been stored. (For a more complete description of this signal, reference is made to the aforementioned patent application, Ser. No. 555,165.) The second way in which the PA flip-flop 92 may be placed into its set state to develop the PA signal is by the concurrent application to an AND-gate 104 of the $DA signal and the WN signal from the WN flip-flop 94. The outputs of the two AND-gates 102 and 104 form the inputs to a two-input OR-gate 106 whose output is connected to the set terminal of the PA flip-flop 92. PA flip-flop 92 is reset by the application to its reset terminal of the $DA signal after it has been delayed by a delaying means, for example a delay line 108, this delay signal being designated as Δ$DA. In the specific implementation of the system here being described, the delay provided by the delay means 108 is 600 nanoseconds. The following two equations define the two signals, set PA and reset PA, which, when applied respectively to the set (S) and reset (R) terminals of the PA flip-flop 92, effect the changing of the state of that flip-flop.

Set PA = (IS·$DA) + ($DA·WN)
Reset PA = Δ$DA

The WN flip-flop 94 may be placed into its set state by the application to the set (S) terminal thereof of a set WN signal. The set WN signal is the output of an AND-gate 110 whose three inputs are the PA signal, the Δ$DA signal and the output of an OR-gate 112. The inputs to the OR-gate 112 are the three signals derived from the Tag Decode Logic of FIGURE 3 which require an indexing step in their operation; i.e., RI, IR and IT except for the Fault variation. The WN flip-flop 94 is reset as a function of the output of a two-input AND-gate 114 whose inputs are the WN signal and the $DA signal. The following two equations define the formulation of the set WN and the reset WN signals.

Set WN = PA·Δ$DA·(RI+IR+IT·$\overline{F}$)
Reset WN = $DA·WN

Complete schematic illustrations for the setting and resetting of the PY, PR and PT flip-flops 96, 98 and 100 could be developed but it is believed that an adequate and more readily understandable description of the set and reset signals for each of these flip-flops may be had from the following equations:

Set PY = $DA·[WN·(ID+DI+IDC+DIC+SD+ AD+SC)]
Reset PY = PY·$ADR
Set PR = PY·$ADR
Reset PR = PY·$DA
Set PT = {[WN·(CI+I)]+PR}·$DA
Reset PT = PT·$ADR In the above equations, those signals designated as F, ID, DI, IDC, DIC, SD, AD, SC, CI and I are those signals which were generated as a function of the IT modifiers (see FIGURE 3). The $ADR signal is the same signal as Δ$DA which, along with its equivalent $INT, is designated by these latter destinations in accordance with the function in which it serves. The $INT signal, which also forms one of the timing signals of FIGURE 4, is the signal which is sent to the memory controller to initiate an access of that memory and reference is made to the aforementioned patent application for a more complete description of this signal's action. The $ADR signal, as will become more apparent as this description proceeds, is that signal which gates the Address Register 62 (FIGURE 2) to cause a transmission of the contents of that register (the address of a memory location to be accessed to be placed onto the address bus 64 extending from that register to the memory unit 10 (FIGURE 2).

The final signal shown initiated in FIGURE 4 is the pulse signal $DP. The signal $DP occurs at a prescribed time after the setting of the PR flip-flop as illustrated in FIGURE 4 by a differentiator 97 and a delay means 99. In the present example, the delay means 99 provides a delay of approximately 450 nanoseconds.

MODIFIERS

Modifier R

Figure 5:
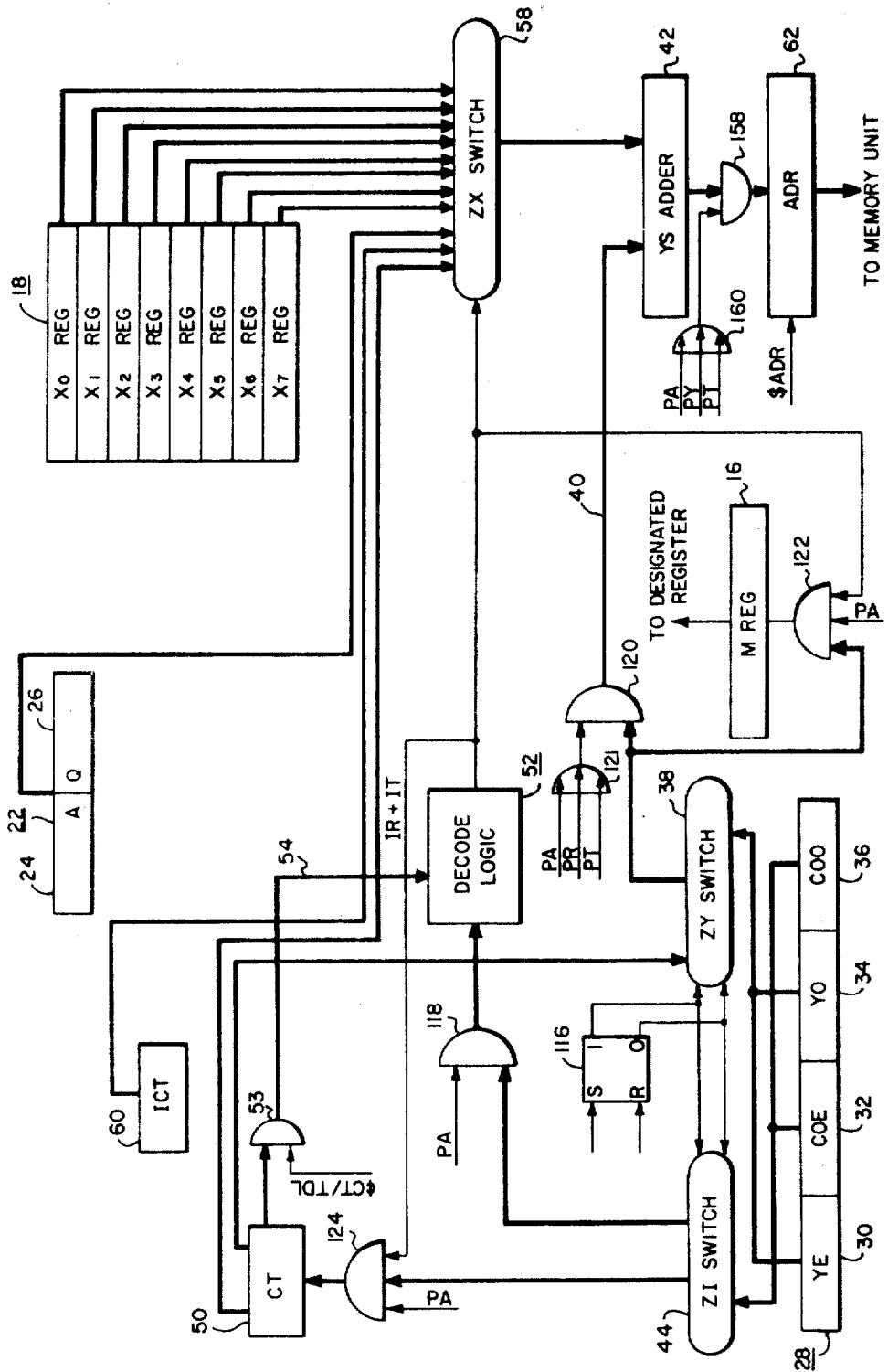
FIGURE 5 is a schematic drawing illustrating a portion of the components shown in FIGURE 2 and further illustrating a portion of the logic utilized in certain address modifications of the present system.

The R modifier is the simplest of the address modifications and, with the exceptions of N, DU and DL, requires only a register modification. That is, the operand address is obtained by adding the designated register to the address contained in the instruction word. Referencing now FIGURES 5 in detail, it is seen that the tag field portion of the contents of the COE or COO-Registers 32 or 36 is selectively gated under the action of a flip-flop 116 through the ZI switch 44 to form an input to an AND-gate 118. (The flip-flop 116 is called the instruction counter flip-flop and, in accordance with its state, determines whether the contents of the YE COE registers or the YO COO registers are to be gated via the ZI and ZY switches.) AND-gate 118, as shown in FIGURE 5, is a two-input AND-gate with the second input thereto being the PA signal. Thus during PA time, which lasts for approximately 600 nanoseconds, the tag portion of the instruction word is gated to the Tag Decode Logic 52 which decodes the six bits of the tag field to determine the type and mode of modification. The output of the Tag Decode Logic 52 is, except when the $t_d$ portion is decoded as N, DU or DL, delivered to the ZX switch 58. In response to this signal one of the registers connected to that switch is gated to the YS adder 42. As was previously stated, those registers connected to the ZX switch 58 include the seven X-registers 18, the ICT-Register 16, the CT-Register 50, the A-Register 24 and the Q-Register 26. During the same PA time, the address portion of the instruction word; i.e., the contents of either the appropriate YE or YO-Register, is gated through the ZY switch 38 to an AND-gate 120 which has been enabled by the application thereto of the PA signal. The output of the AND-gate 120 is also supplied to the YS adder 42. YS adder 42 adds these two inputs, that form the ZX switch and that from the AND-gate 120, to form an effective address and delivers this address to the Address Register 62. Upon the occurrence of the $ADR signal, the effective address is sent from the Address Register 62 to the memory unit 10 (FIGURE 2). Thus it is seen that, in all of the R modifications with the exception of N, DU and DL, the modification performed is purely one of registering; i.e., the adding of a designated register or portion thereof to an address to determine the effective address of an operand.

In the case of N, no modification takes place and the address given in the instruction word is the operand address.

In the case of DU (Direct Upper) or DL (Direct Lower) the address portion of the instruction word is used directly as an operand. In this situation, the output of the Tag Decode Logic 52 is delivered to a three-input AND-gate 122 whose other inputs are the PA signal and an input from the ZY switch 38. The output of the AND-gate 122 is to the M-Register 16. In response to the signal from the Tag Decode Logic 52 the contents of the appropriate YE or YO-Register are gated to the M-Register 16 and from thence to the appropriate register designated by the command portion of the instruction word.

Figure 6:
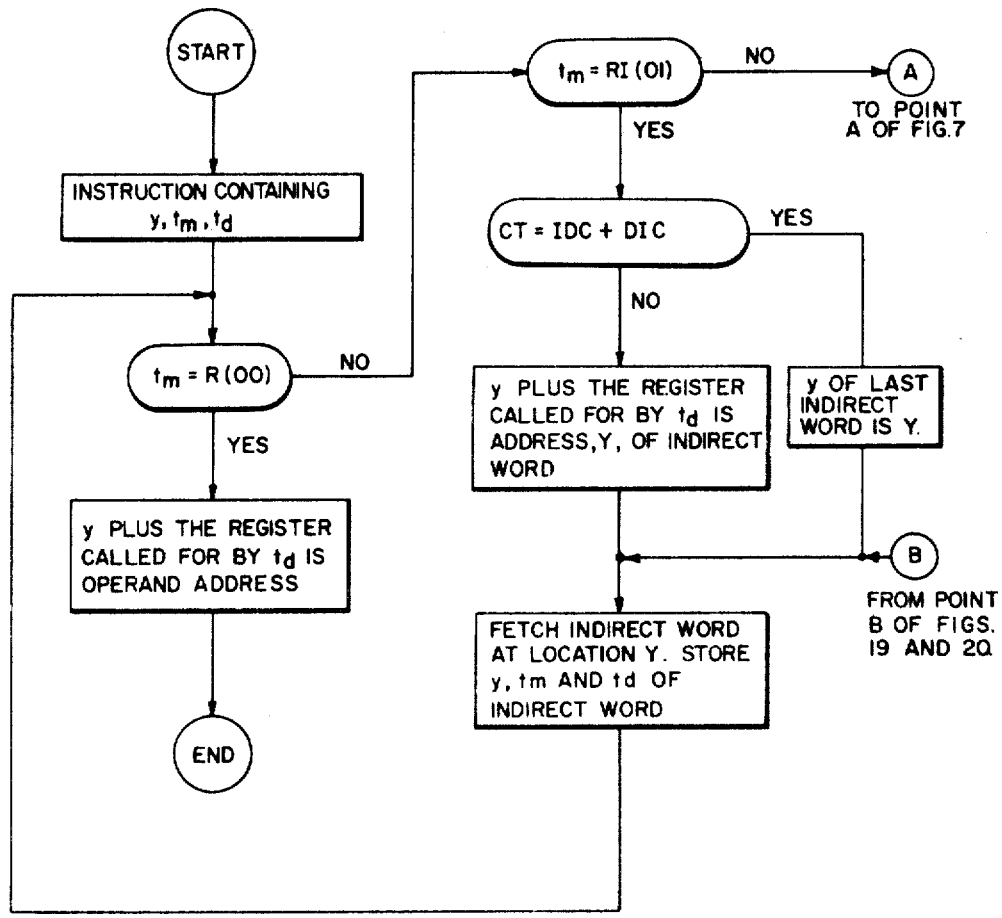
FIGURE 6 is a flow chart useful in the description of the R and RI address modifications.

A flow chart for the basic R type of modificatoin is shown in FIGURE 6. In this as well as in subsequent flow charts, the symbol y is used to designate an address portion of a word and $t_m$ and $t_d$ are used to designate the appropriate parts of the tag field.

Modifier RI

The RI modification differs from the R modification in that the address obtained by the adding of a register to the address contained in the instruction word is the address of an indirect word and not the address of an operand. (In the case of $t_d=N$, the address contained in the instruction word is the address of the indirect word.) The indirect word obtained by the use of this address is then tested and any modification called for by the indirect word is accomplished to either obtain another indirect word or an operand.

Insofar as the R portion of the RI modification is concerned, it is substantially the same as that done for an R modification. There is, however, one significant distinction. This distinction exists in the testing of the CT-Register 50 (FIGURES 2 and 5) to determine if the contents of that register indicate an IDC or DIC variation of the IT type modifier. This could occur by having an RI modification as a portion or part of an address development which started out as an IT modification. In this situation, as is indicated by the flow chart of FIGURE 6, there is a variance in the manner in which the modification takes place. As will be more completely explained hereinafter, the CT-Register retains the tag portion of the instruction word during either the IR or IT type modification times. The contents of the CT-Register are interrogated during the RI type of modification to determine if the particular development began as an IDC or DIC, in which case the continuation of the address development will vary, as will be explained with respect to IDC and DIC.

Referencing once again FIGURE 5, it is seen that the RI modification is accomplished substantially as follows. The IC flip-flop 116 determines which of the pair of registers YE COE or YO COO is selectively gated through the ZI and ZY switches during PA time. The tag field decoding is accomplished in the Tag Decode Logic 52 and the appropriate register is added to the address portion of the instruction word in the YS adder 42, as was explained with respect to the R modification. This modified address is passed to the Address Register 62 via an AND-gate 158 during PA time. At the end of PA time and with the occurrence of the signal $ADR, the modified address is sent to the memory unit 10 (FIGURE 2). Because this is an RI type of modification, it may be seen from FIGURE 4 that the WN flip-flop 94 now sets. The output of this flip-flop, the WN signal, indicates that the processor is waiting for an instruction (indirect word) from the memory unit and the processer essentially idles until the instruction is received.

When the processor receives the indirect word from the memory unit, the address and tag portions will be placed in the YE COE registers from which the original instruction was taken. With the sending of the indirect word, the memory unit will also supply the $DA signal (see FIGURE 4). Any modification called for by this indirect word will be executed. In the normal case the indirect word will be either another RI or an R (although it is possible that it may be an IR or IT word). An indirect word containing an RI, IR, or IT modifier will cause a new address to be prepared and a new indirect word to be obtained from it. This will continue until an R modifier is found. When an R modifier is found the address development will terminate with the preparation of the operand address, as was explained with respect to the R modifier.

All modifiers which were available under the R type of modification are available with respect to RI with the exception of Direct Upper, DU, and Direct Lower, DL, modifications.

Modifier IR

The modifier IR indicates an indirect, then register modification. When this modifier is found, the tag field is stored in the CT-Register 50 and the address contained in the instruction word utilized to obtain an indirect word. If the tag field of the indirect word specifies an R or IT modifier, the address contained in the indirect word plus the contents of the register designated by the tag field stored in the CT-Register 50 is the operand address. If the indirect word contains an RI modifier a new indirect word is obtained, as directed, by using the address and tag field contained in the first indirect word. If the indirect word contains an IR modifier, the contents of the CT-Register are replaced with the new tag field and a new indirect word is obtained from the address in the first indirect word. These cycles will continue until there is a termination of address development by the finding of an R or IT modifier. As was the case with the RI modifier, the IR modifier may use all of the action steps available to the R modifier except the DU and DL.

Figure 7:
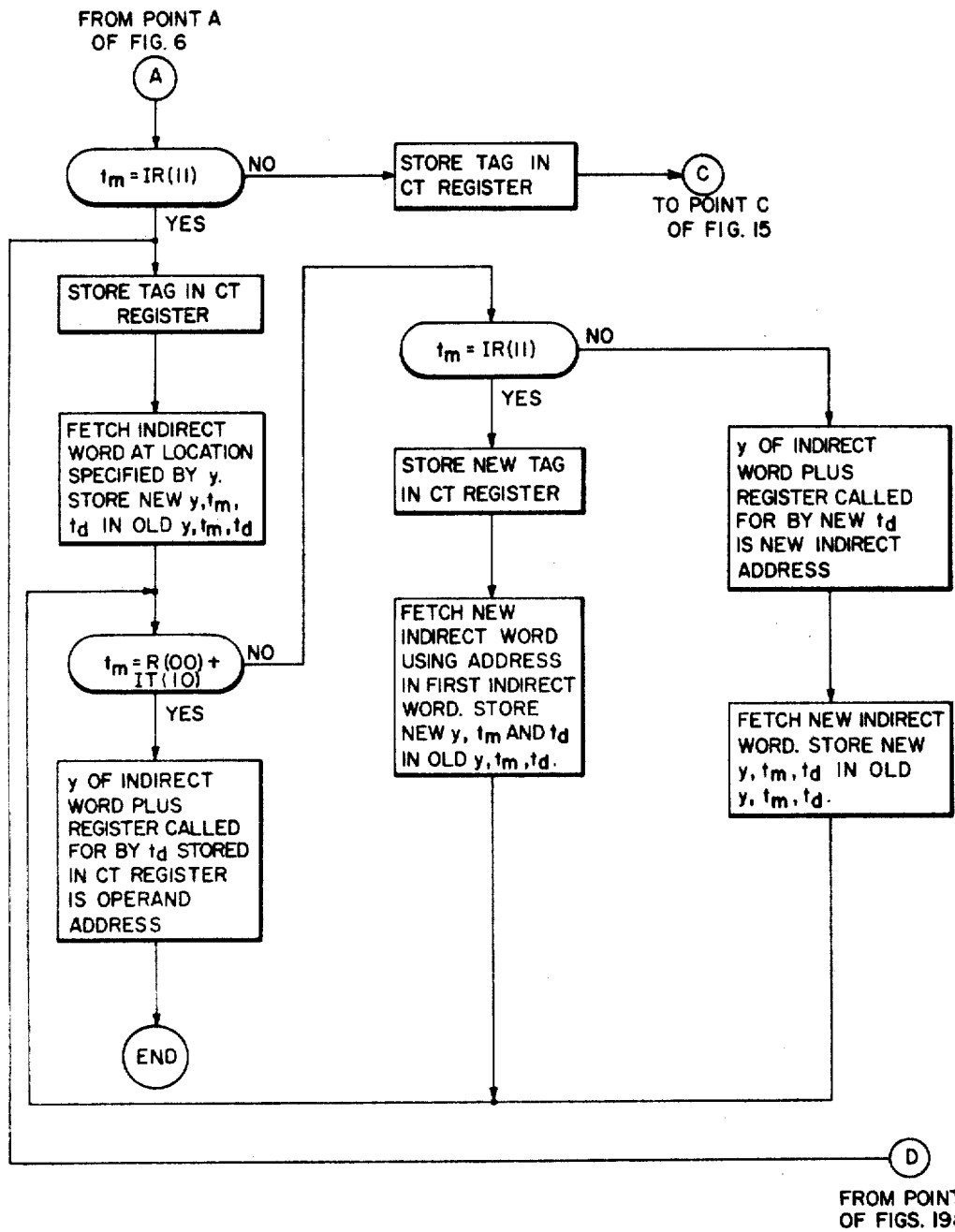
FIGURE 7 is a flow chart useful in the description of the IR address modification.

For a better understanding of the IR modifier, reference is made to FIGURE 5 and the flow chart of FIGURE 7. Referencing now FIGURE 5 in detail, it is seen that as previously discussed with respect to the R and RI modifiers, during the PA time the address portion of the instruction word is delivered from the Instruction Registers to the YS adder 42, and hence to the Address Register 62 via the AND-gate 120. At this same time, the tag portion is delivered to the Tag Decode Logic 52 via the AND-gate 118. As is also indicated in FIGURE 5, because this is an IR modification an output of the Logic 52 enables an AND-gate 124 and the tag portion (bits 30–35) of the instruction word is transferred via the ZI switch 44 and the AND-gate 124 to the CT-Register 50. The CT-Register 50 stores this tag portion for future use. At the end of PA time and with the occurrence of $ADR, the address contained in the original instruction word is gated from the Address Register 62 to the memory unit to obtain an indirect word. This indirect word is brought from memory and the new address and tag portions are now stored in the Instruction Registers which contained the original instruction.

If the tag of the indirect word indicates an R or IT modification, the operand address will be comprised of the address contained in the indirect word plus the contents of the register called for by the $t_d$ portion of the tag stored in the CT-Register 50. The operand address is obtained in the same general manner as executing an R modifier except that the register contents gated to the YS adder 42 is the register specified by the contents of the CT-Register 50. This operation is illustrated in FIGURE 5 by the gating of the CT-Register 50 to the Tag Decode Logic 52 over bus 54 via an AND-gate 53. AND-gate 53 is enabled by a signal designated ¢CT/TDL. This signal, ¢CT/TDL, is present when the CT-Register contains an IR modification and the tag bit positions of the ZI switch (the tag configuration of this instruction word in the appropriate COE or COO register) is an R or an IT. This condition may be represented by the equation:

$$\text{¢CT/TDL} = (CT = IR) \cdot (ZI = R + IT)$$

This same signal may also be used to inhibit the $t_m$ portion of the indirect word from being applied to the Logic 52 so that only the $t_m$ portion stored in the CT-Register will be decoded.

In the situation where the indirect word also contains an IR modifier, the new tag replaces the original tag in the CT-Register 50 and a new indirect word is obtained using the address contained in the first indirect word. The storage of the new tag and obtaining of the new indirect word will be done exactly as was the case with the original instruction word. The address and the tag portions of this new indirect word, as was the previous case, will be stored in the originally used Instruction Registers. As is best illustrated in the flow chart of FIGURE 7, the process will be repeated until such time as an R or IT modifier is found.

The remaining possibility is that the first indirect word obtained under an original IR modification contains an RI modifier. If this be the case, a new indirect word is obtained in accordance with the address and tag contained in the indirect word and in a manner described with respect to the RI modifier. Again, this cycle may repeat or may include IR cycles until an R or IT modifier is found and the address development terminated by the obtaining of an operand address.

From the foregoing description it is seen that the IR modifier permits the modification of an indirect word in accordance with the tag of a previous instruction. This previous instruction may have been the original instruction word or it may have been an indirect word. It is important to note in all cases, however, that the final modification does not come from the indirect word itself as was the case in the RI modification.

*IT modifier*

General.—The modifier IT indicates, in most instances, an indirect and then tally modification. The three exceptions to this rule are the first three listed whose mnemonics are F, CI and I respectively designated as Fault, Indirect Byte (unmodified) and Indirect (unmodified). Under the Fault (F) variation as will be explained in detail, no indirect word is obtained. At all other times an indirect word is obtained with an IT modifier.

Figure 8:
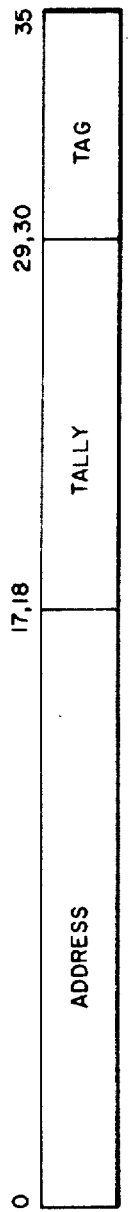
FIGURE 8 illustrates the format of an indirect word which includes a tally portion.
Figure 9:
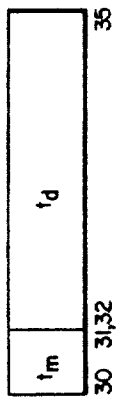
FIGURES 9, 10 and 11 illustrate the various tag variations which are possible in the indirect word shown in FIGURE 8.
Figure 10:
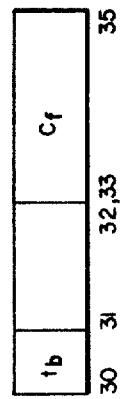
Figure 11:

Those IT variations which employ a tallying operation utilize an indirect word which differs from that of the normal instruction word shown in FIGURE 1. The format of this type of indirect word is shown in FIGURE 8. It is seen from that figure that the format is very similar to the normal instruction words with one exception being that bit positions 18–29, which previously defined the operational code, now hold what is known as the tally. The tag field's use may also be different than with the standard instruction word. Depending upon the prior tag (tally designator), the tag field (bits 30–35) is used in one of three ways. In the case of the prior tags whose mneumonics are I, DI, ID, DIC, IDC and F, the tag field is the standard one having a $t_m$ portion of bits 30–31 and a $t_d$ portion of bits 32–35 as is shown in FIGURE 9. In the case of the mneumonics CI and SC and as is illustrated in FIGURE 10, bit 30 (designated $t_b$ in FIGURE 10) is the character size designator and in accordance with its binary state of 1 or 0 designates respectively a nine or six bit character size. Bits 31–32 are permanent 0's in FIGURE 10 and bits 33–35 are designated as the character field portion ($C_f$). As will be more fully explained, these bits define a particular byte or character. The remaining possibility is shown in FIGURE 11 and is used with the mneumonics AD and SD. In this case the entire tag field is designated as the delta portion.

$t_d = F$ (0000) Fault.—When the $t_m$ portion of the tag field designates an IT type of modification and the $t_d$ portion specifies that it is a Fault, the processor reacts automatically without further program aid to jump out of the program it has been running and into a specific subroutine. While this is not, perhaps, an address development as the term is commonly employed, it is an address development in the sense that it provides a pointer to a subroutine. The Fault modification as it will be here designated, provides a valauble programming tool in that it permits a programmer to shift from his normal program to a subroutine by merely changing the tag field of any instruction word. As will become apparent, this shifting is done entirely by means of hardware and the programmer who is using the machine need not know the exact location of the subroutine which has been established as a portion of the executive program of the entire system.

In the system presently being described, the term "Fault" does not necessarily mean that there has been an error made or that there has been a malfunctioning of the system. "Fault", in the present context, means merely that the processor is to go or is to be placed into a special mode of operation or routine. In the present situation this appears to be well illustrated in that the placement of the Fault in the $t_d$ part of the tag field is a premeditated act on the part of the programmer. It should be here noted that this means of placing the processor into the Fault routine is only one of approximately sixteen ways of accomplishing this and reference is made to the aforementioned application, Ser. No. 555,165 for other ways of instituting or initiating the Fault routine.

As in the previously described modifications, the first occurrence in the presently being described operation is the bringing of the tag field to the Tag Decode Logic 52 via the ZI switch 44 and the AND-gate 118 during PA time (FIGURE 5). (During this time and because it is an IT type of modification, the tag field is also stored in the CT-Register 50 via AND-gate 124. Additionally, the address portion is transmitted via the ZY switch 38 and the AND-gate 120 to the YS adder. However, while both of these transfers are accomplished, they are "don't care," situations as neither the tag nor the address of the instruction word is used in the Fault variation of the IT modifier.) With the decoding of the tag field the Tag Decode Logic 52 provides an output on the F line from one of the AND-gates 88 (see FIGURE 3).

Figure 12:
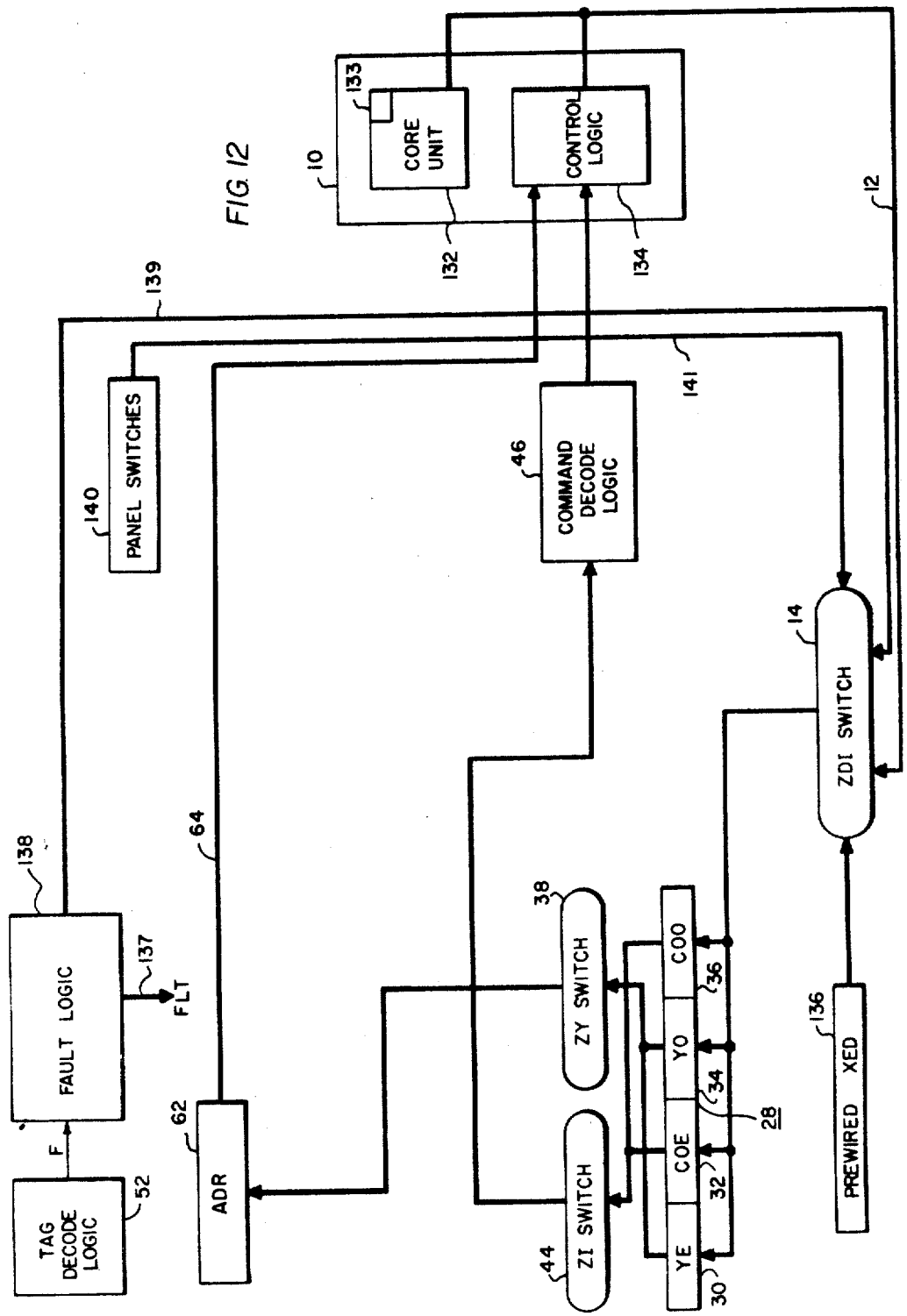
FIGURE 12 is a block diagram illustrating the manner in which Faults are processed by the system of the present invention.

The Fault routine operation of the processor and the part played in this routine by the IT/Fault tag field modifier is best understood with reference to FIGURE 12. In that figure there is shown the memory unit 10 which includes a core unit 132 and a configuration of control logic 134. Included within the core unit 132 is a block 133 which represents a prescribed number of specific memory locations which are addressed by the processor in the execution of a Fault routine. Those components of the processor shown, including those previously described with respect to FIGURE 2, include the ZDI switch 14 which receives information on the input bus 12 from the memory unit 10. The ZDI switch 14 also receives information from a block 136, designated as prewired XED, which represents a prescribed configuration of bits which will be gated through the ZDI switch 14 to the appropriate operational code bit positions (bit positions 18–26) in the COE and COO-Registers at the appropriate time. The above configuration of bits constitutes what is know as an XED command (Executive Double) which directs that a pair of words will be brought from the memory unit starting at the address which is in the address portion of the Instruction Registers. This will be more fully explained hereinafter. Further inputs to the ZDI switch 14 are a seven line bus 141 from a group of panel switches 140 and a four line bus 139 from a component designated as Fault Logic 138. Fault Logic 138 receives information, insofar as the present invention is concerned, from the Tag Decode Logic 52 in response to the decoding of the tag Fault. In addition to the output bus 139, Fault Logic 138 provides an output designated as FLT (represented by an arrow 137) the function of which is to indicate to the processor that a Fault condition exists.

Further included within FIGURE 12 are the four Instruction Registers 28 (YE, COE, YO and COO). The outputs of the YE and YO-Registers are connected to the Address Register 62 via the ZY switch 38. The output of the Address Register 62, an eighteen line bus 64, extends from that register to the control logic 134 of the memory unit 10. The outputs of the COE and COO-Registers are directed, as before, via the ZI switch 44 to the Command Decode Logic 46, the output of which is also connected to the control logic 134 of the memory unit 10.

The panel swtches 140 are two-position switches, the two positions representing, respectively, binary 1's and binary 0's. These are seven of these switches, in the present embodiment, and they may be placed on the control panel of the processor. The seven panel switches 140 are operator-adjustable and serve to form a part of the address of an instruction word, to be subsequently described, which is one of those located within the block 133 of the core unit 132. The portion of the address which these switches designate is the starting address of those locations of the block 133.

Assume now that a Fault condition has been recognized by the processor by virtue of an output on the FLT line 137 from the Fault Logic 138. The Fault Logic 138 will further develop a four bit output, in a manner to be hereinafter described, which is delivered to the ZDI switch 14 over bus 139. The ZDI switch also receives the output of the seven panel switches 194 and the nine bit XED command from the block 193. These several inputs to the ZDI switch; i.e., from elements 136, 138 and 140 are then transmitted by ZDI switch 14 to the proper position within the Instruction Registers 28 to collectively formulate, therein, an instruction word.

Figure 13:
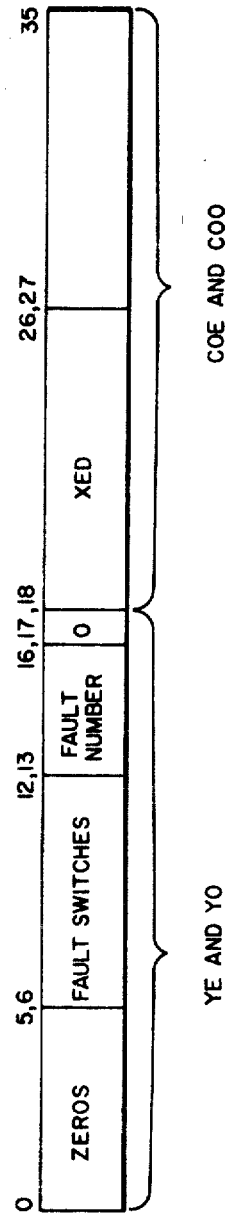
FIGURE 13 is a depiction of an instruction word formulated during the processing of a Fault and useful in the explanation of FIGURE 12.

The format of the instruction word as is now contained in the Instruction Registers 28 is illustrated in FIGURE 13. Referencing that figure, it is seen that insofar as the YE and YO-Registers are concerned (bits 0–17), (bit positions 0–5 are 0's while positions 6–12 contain the bit configuration established by the panel switches 140. Bit positions 13–16 contain the four bit configuration which was derived from the Fault Logic 138. Bit 17 is a 0. The address bits collectively designate a particular location within block 133 of the core unit 132. In the command portion of this instruction word, (the COE and COO-Registers) bit positions 18–26 contain the binary designation of the XED command which was supplied by the block 136. The rest of the bit positions of the command portion of the instruction word are not important to this instruction.

Having the above-described contents in the Instruction Registers 28, the processor, in its customary mode of operation, decodes the XED command in the Command Decode Logic 46 and sends the results via a bus to the memory unit 10 (FIGURE 12). At the same time, the address (bits 0–17) is sent to the memory unit via the Address Register 62 and the bus 64. As was previously stated this address will cause the memory unit to access a particular location within the block 133 of the core unit 132. In response to the Execute Double (XED) command, the memory unit will bring the addressed pair of instruction words from the core unit 132 and send this pair of instruction words via the bus 12 to the ZDI switch 14 to be placed into the Instruction Registers 28.

The action directed by these two words will be dependent upon the particular situation involved. Assuming that a branching operation were desired, the two words would be instructions. The first or even of these two instructions might direct that the processor should store the data and instructions of the program upon which it was working. Upon the completion of this operation the second instruction would direct the processor to transfer to a particular location in the memory which is the starting location of some subroutine. The last instruction of the subroutine would, in the normal case, return the processor to its original program.

Figure 14:
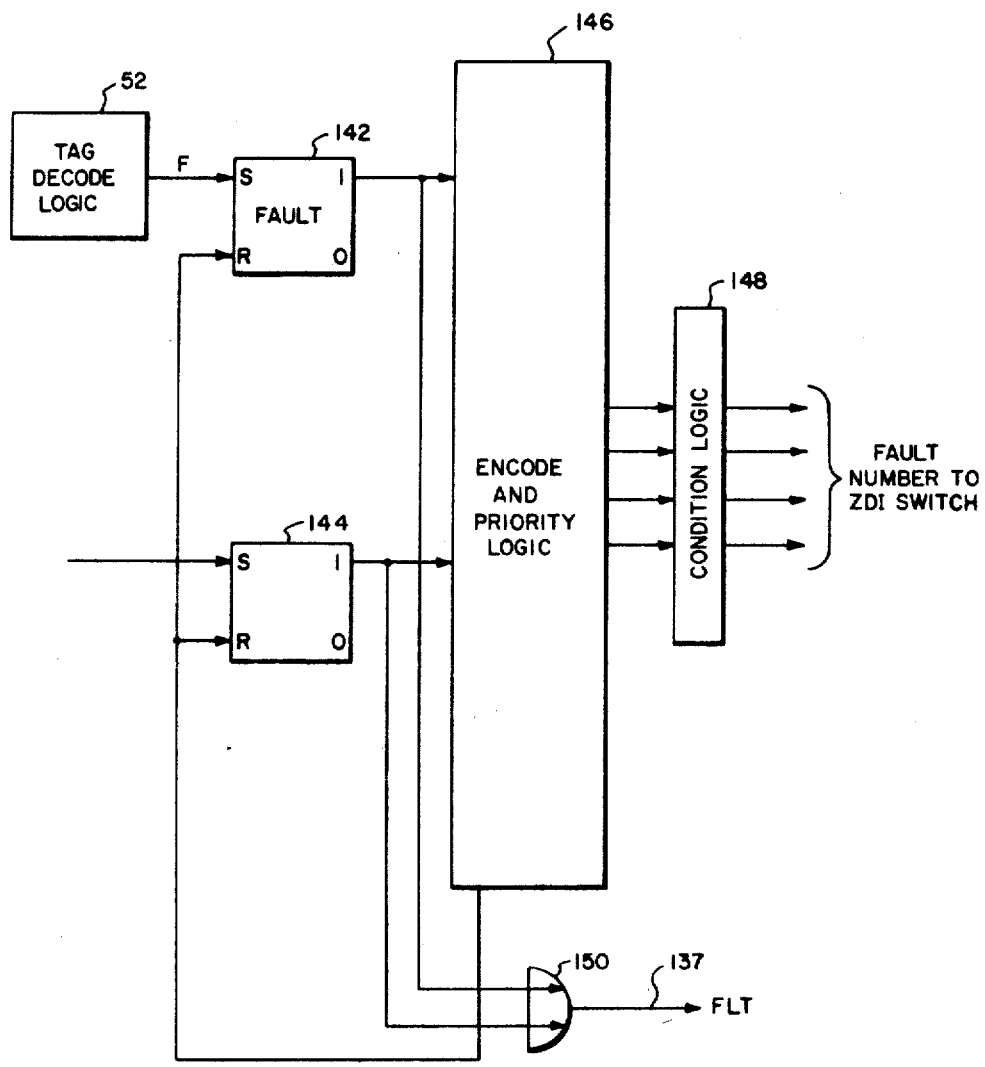
FIGURE 14 illustrates in greater detail the processing of Faults and the generation of certain signals necessary to this operation.

FIGURE 14 illustrates in greater detail the operation of the Fault Logic 138 and the manner in which it develops the signal on the FLT line 137 and the four bits utilized as a portion of the just described address. It is seen in FIGURE 14 that the Tag Decode Logic 52 delivers a signal F to the set terminal of a Fault flip-flop 142. (A second flip-flop 144 is also shown as being representative of the other ways in which a four bit configuration may be derived. For an example of the flip-flop 144 and the manner in which other Faults are derived, reference is again made to the aforementioned application, Ser. No. 555,165.) In response to the F signal, flip-flop 142 is placed into its set state thereby providing an output signal from the one output terminal thereof. The output of the flip-flop 142 forms an input to an Encode and Priority Logic 146. (The output of the flip-flop 144 is also applied to the logic 146). The Encode and Priority Logic 146 is comprised of encoding and priority determination logic circuits which are known in the art and do not form a part of the present invention. In response to the input from the flip-flop 142, the Ecode and Priority Logic provides a specific four bit output which is subsequently utilized as a part of the address.

It is noted that the Logic 146 is said to include priority logic. It is to be expressly understood that the Fault flip-flop 142 is only one of several ways of initiating a Fault routine. In the implementation of the complete system of which the present description forms a part, there are approximately sixteen different types of Faults. The majority of these are initiated in a manner similar to that of the Fault here being described; i.e., the setting of a single flip-flop and reference is once again made to the aforementioned patent application, Ser. No. 555,165, for other examples of the initiation of Fault routines. Because of the nature of these Faults, some must be answered before others and the Faults are, therefore, divided into five priority groups. The priority portion of Logic 146 determines the answering of the various faults. However, this priority scheme does not, per se, form a portion of the present invention and as priority schemes in general are known, it is not deemed here necessary to describe this scheme in detail.

The four bits from the Logic 146 are transmitted to a block of circuitry designated Condition Logic 148. Condition Logic 148 prevents the transmission of the four bit information item from the Logic 146 until such time as the processor, which has been previously made aware of the Fault condition, has had time to reorient itself and prepare itself for the execution of the new instruction. This new instruction, as was previously discussed, will be the XED instruction which was explained with respect to FIGURE 13. This reorientation or initialization is necessary because a Fault may occur at any time and the processor may be in the middle of an operation which cannot be interrupted. The Faults, as previously explained, are divided into several categories, some of which must be answered immediately and others which can, of course, wait until such time as the processor is ready to handle them in the normal sequence. However, as soon as the appropriate conditions have been met, Condition Logic 148 will release the four bit information item for transfer to the ZDI switch 14 (FIGURE 12) via bus 12.

Figure 15:
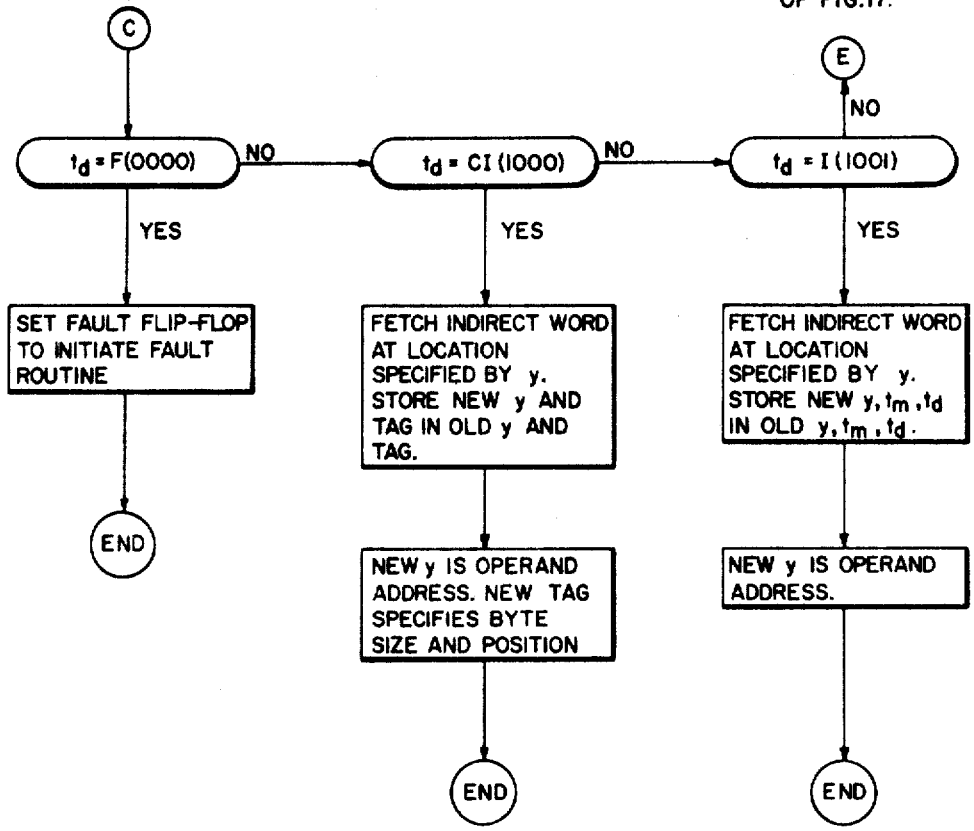
FIGURE 15 is a flow chart useful in describing the F, CI and I address modifications.

The last feature to be described with respect to Fault routine concerns the generation of the signal FLT on the line 137. This signal indicates to the processor that a Fault routine is to be entered. In essence, this signal is the output of an OR function represented by an OR-gate 150 in FIGURE 14. The inputs to the OR-gate 150 are from the one output terminals of the several flip-flops shown in that figure and which are placed in their set state in response to the Fault condition initiation. Thus, if any of the flip-flops are in their set state, as would be the case if there were a Fault present, the signal on the line 137 will be at a high level indicating to the processor that a Fault is present. (It should be again noted that a complete system will possibly employ several more Fault flip-flops, the one outputs of all Fault flip-flops will be similarly connected as is represented by the flip-flop 144.) The flow chart for $t_d=F$ is shown in FIGURE 15.

$t_d=CI$ (1000) Indirect Byte.—The modifier CI is the second of those listed under the IT type of modification which does not employ a tallying operation. CI provides the capability of character handling in what is, essentially, a word machine. In the CI operation an indirect word is obtained from the address in the instruction word. The indirect word contains the operand address, the character or byte size (six or nine bit) and the byte position. The operation of the CI modifier may best be understood with respect to FIGURE 5 and the flow chart of FIGURE 15. Referencing now FIGURE 5 it is seen that during PA time, because this is an IT type of modification, the tag portion of the instruction word is delivered to the CT-Register 50 via the AND-gate 124. As before, the address in the instruction word is delivered to the Address Register 62 via AND-gate 120, the YS adder 42 and AND-gate 158 during PA time. At $ADR time the Address Register 62 is gated to the memory and during WN time the indirect word at the location specified by this address is brought into the Instruction Reigsters 28 to replace the original instruction word. This indirect word, which is brought into the processor during WN time, contains only an address portion and a tag portion; any other information in this indirect word will be ignored. The system will now enter a PT time for the indirect word using the address in the indirect word as the operand address and operating upon a particular size and position of byte of the operand, as designated by the tag of the indirect word, in accordance with the operation code of the original instruction word.

The format of the tag portion of the indirect word obtained during a CI operation is shown in FIGURE 10. Expanding upon what was previously briefly discussed, the tag portion, bits 30–35, designates whether the operation designated by the original instruction word is to be performed on a six bit byte or a nine bit byte. The tag also specifies the particular byte on which the operation is to be performed. In the present instance, bit 30, if it is a binary 1, designates that the machine is to operate in a binary nine bit mode while if bit 30 is a 0, the machine is to operate in a six bit mode. Bits 31–32 are not used. Bits 33, 34 and 35 according to their binary 1 and 0 configuration specify which of the characters is to be affected. Thus, the operation designated by the operational code of the original word is performed upon a character of an information item the size (either six or nine bit byte) and position of which is specified by the tag portion of the indirect word. This type of modification is illustrated in the flow chart of FIGURE 15.

It is noted that the tag portion of the original word was stored in the CT-Register 50 and that no further mention was made of its use. In this modification, the old tag is not actually used and is maintained only to designate that the machine is in an IT type of modification.

$t_d=I$ (1001) Indirect.—The modifier I is the last of those under the IT modification type which does not employ a tallying operation. The Indirect or I modifier is one which specifies simply that an indirect word will be obtained from the address contained in the instruction word. The indirect word contains the operand address and the indirect word remains unchanged. Specifically relating this operation to FIGURE 5, during PA time the tag portion is transferred to the CT-Register 50 while the address portion is transferred to the YS adder 42 and from thence to the Address Register 62 via the ZY switch 38. Upon the occurrence of the signal $ADR, this address is delivered to the memory unit, which unit in turn supplies the indirect word from the location specified by that address. The address and tag portions of this indirect word replace the original word in the Instruction Registers. This new address is the address of the operand which is to be acted upon in accordance with the operational code portion of the original instruction word.

This modification is illustrated in the flow chart of FIGURE 15. As was the case with the CI modification, the storing of the original tag in the CT-Register 50 was only for the purpose of indicating that an IT type of modification is in progress.

$t_d=SC$ (1010) Sequence Byte.—In the SC or Sequence Byte modification, an indirect word is obtained from the address contained in the original instruction word. The indirect word contains the operand address, the position (count) of the particular six or nine bit byte desired, and a tally. Every time this word is referenced the byte is increased by one and the tally is decreased by one, and it is rewritten into the location from which it was obtained. In the six bit mode, the byte position count will progress up to six and back to zero. In the nine bit mode, the count will be to four and then to zero. When the byte position goes to zero, the address will be increased by one. When the tally reaches zero, a tally runout indicator will set. Sequence Byte (SC) allows a character or byte type of operation plus an automatic indexing to the next byte and the counting of the bytes affected. It is to be expressly understood, although it is not here illustrated, that the principles of SC could be used for decrementation as well as incrementation.

Figure 16:
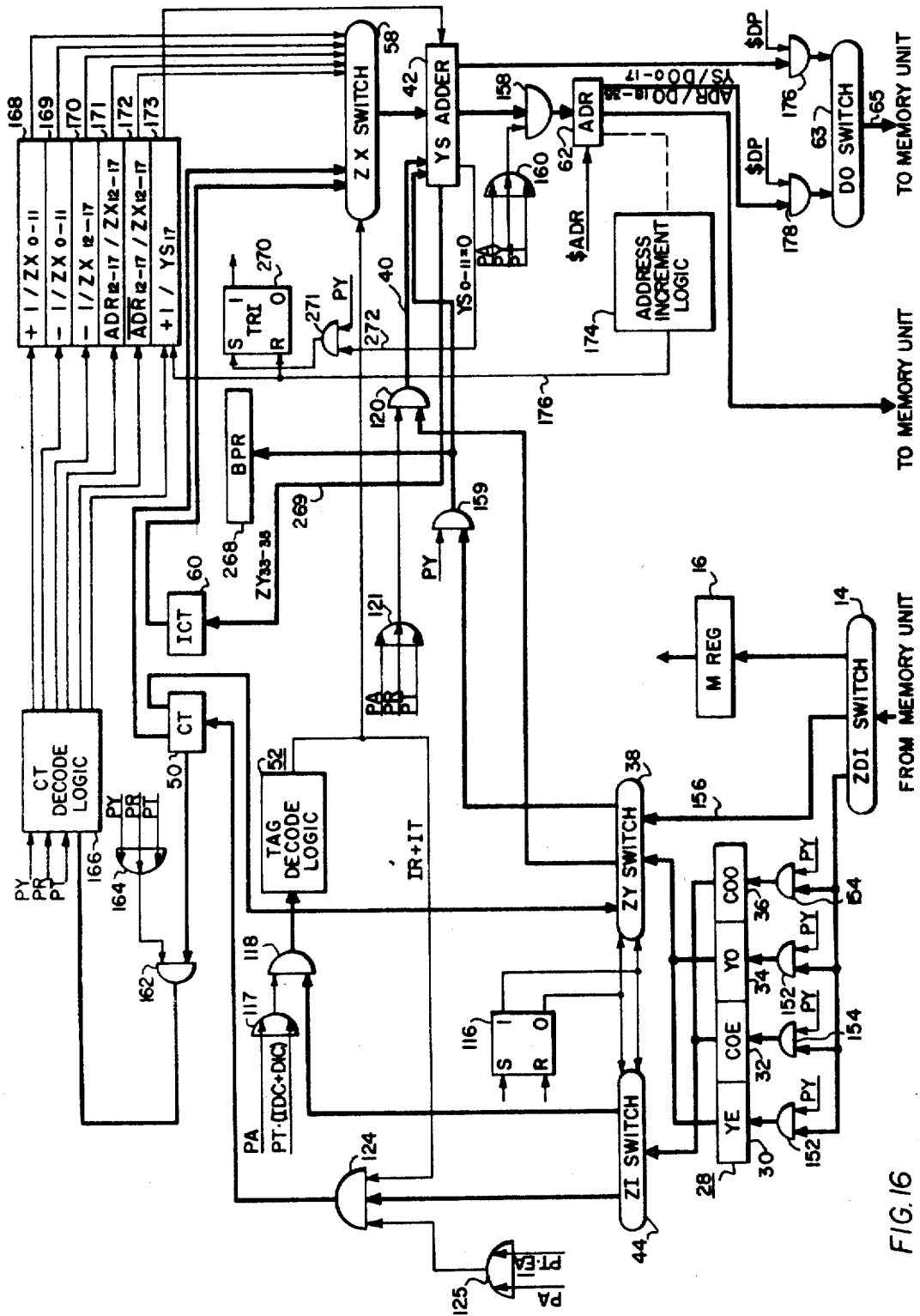
FIGURE 16 is a detailed schematic drawing showing the control of data flow during certain address modifications and useful in explanation and understanding of address modifications employing a tally operation.
Figure 17:
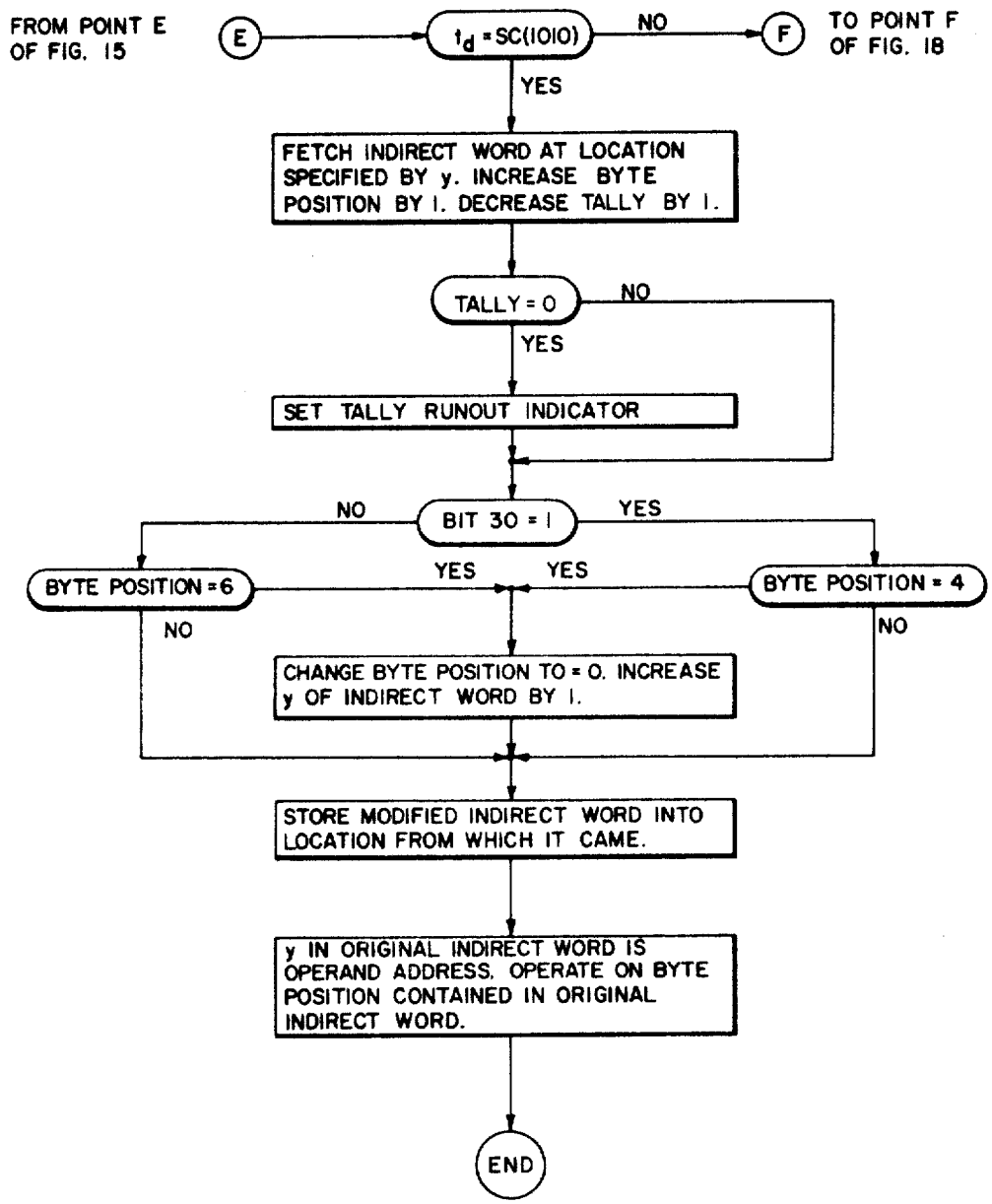
FIGURE 17 is a flow chart useful in the explanation of the SC address modification.

The manner in which SC operates may best be seen with respect to FIGURE 16 and the flow chart of FIGURE 17. Referencing now these figures, the original instruction word is brought from the Instruction Registers 28 during PA time. The tag portion of this word is transferred via the ZI switch 44 to the Tag Decode Logic 52 via the AND-gate 118 and to the CT-Register 50 via AND-gate 124, all in the manner previously described. Because this is a PA time, the address portion of the instruction word is delivered via the ZY switch 38 and AND-gate 120 to the YS adder 42. AND-gate 120 is enabled by the output of a three-input OR-gate 121. The inputs to OR-gate 121 are the PA, PR and PT signals. From the YS adder 42 the address is transferred to the Address Register 62 via an AND-gate 158 which was enabled by the output of an OR-gate 160 whose inputs are the PA, PY and PT signals. As the address now in the Address Register 62 is the address which is used to obtain an indirect word, there being no modification of this address, at the occurrence of the signal $ADR the contents of the Address Register 62 will be gated to the memory unit for the accessing and bringing into the processor of the indirect word during WN time.

At the end of WN time the PU flip-flop is set to initiate PF time. During PW time the indirect word is present at the ZDI switch 14. As is shown in FIGURE 16, the first eighteen bits (the address portion) of the indirect word are directed via a pair of AND-gates 152 to the appropriate YE or YO-Register. Bits 30–35 are gated by a pair of AND-gates 154 to the proper places in the appropriate COE or COO-Register. Also at PY time the entire last eighteen bits (bits 18–35) of the indirect word are directed by the ZDI switch 14 over a bus 156 to the ZY switch 38. These eighteen bits are then transmitted via an AND-gate 159, whose second input is the PY signal, directly to the YS adder 42. Because this is a PY time, AND-gate 158 is enabled and thus these eighteen bits are transferred from the YS adder 42 to the Address Register 62.

As is illustrated in FIGURE 16, one output of the CT register 50 is to a two-input AND-gate 162 whose other input is the output of a three-input OR-gate 164. The inputs to the OR-gate 164 are the PY, PR and PT signals. Therefore, during PY, PR and PT times, the contents of the CT-Register 50 are gated via AND-gate 162 to a CT Decode Logic 166. The CT Decoding Logic 166 is of any suitable known type and serves to decode the contents of the CT-Register 50 to provide a specific output in accordance with each input configuration. As shown in FIGURE 16, the output of the CT Decode Logic 166 serves to selectively enable one or more of six blocks 168 through 173 each of which provides a separate and distinct function. [Block 168 ($+1/ZX_{0-11}$) serves, when gated to the YS adder at the appropriate time, to add one to or increment the tally portion of an indirect word. Block 169 ($-1/ZX_{0-11}$) decrements the tally portion by one. Block 170 ($-1/12_{12-17}$) will decrement the last six bits in the YS adder by one and is normally used to decrement the tag portion of an indirect word. Blocks 171 and 172, designated $ADR_{12-17}/ZX_{12-17}$ and $$ADR_{12}/ZX_{12-17}$$

respectively, represent the transferring of the last six bits of the Address Register (block 171) or the inversion of these six bits (block 172) to the ZX switch for placement in the YS adder. The output of the block 173 ($+1/YS_{17}$) does not pass through the ZX switch but goes directly to the YS adder 42 and is used to increment the last six bits contained therein by one. This is normally used to increment the byte or character count.] In the particular situation here being described, an IT-SC modification, the CT Decode Logic 166 will provide that blocks 169 ($-1/ZX_{1-11}$) and 173 ($+1/YS_{17}$) will be enabled and the corresponding inputs represented by these blocks will be applied to the YS adder. This action has taken place during PY time when, as has been previously explained, the YS adder also has as an input the eighteen least significant bits, the tally and tag portions (FIGURE 8), of the indirect word. With this given set of inputs to the YS adder 42, the tally will be decreased or decremented by one and the last three bits of the tag (the byte position count) will be incremented by one. In more complete explanation of the last statement, it should be restated that the tag portion of an indirect word for an SC modification has the format shown in FIGURE 10.

In addition to the above, at least one and possibly two other functions take place during the PY time. The first of these functions which will always occur is the storing of the original byte position for the final operation. This is done by transferring the last three bits (bits 33–35) of the indirect word to a Byte Position Register (BPR) 268 via the AND-gate 159 and a bus 269. The second function which may occur during PY time is the setting of a Tally Runout Indicator (TRI) which in FIGURE 16 is shown as flip-flop 270. As shown in FIGURE 16, a line 272, designated as $YS_{0-11}=0$, forms one input to an AND-gate 271 whose output is connected to the set input terminal of the TRI flip-flop 270. The other input to the AND-gate 271 is the PY signal. The line 272 ($YS_{0-11}=0$) represents an AND-ing function and the signal level on this line will be high (a binary 1) when bits 0–11 of the YS adder are all 0's. During each IT modification employing a tally, the YS adder contains the tally portion (bits 18–29 of the indirect word) in its positions 0–11 during PY time. Therefore, if during PY time YS adder positions 0–11 all contain binary 0's the tally of the indirect word has run out (gone to 0) and the Tally Runout Indicator 270 will set.

The PY flip-flop will now reset and the PR flip-flop will set. It should be pointed out that at PR time the gate 158 which gates the YS adder 42 to the Address Register 62 is turned off. During PR time, therefore, the Address Register 62 serves to store the lower half of the modified indirect word; i.e., the decremented tally and the incremented character or byte count.

With the arrival of PR time the output of OR-gate 121 enables AND-gate 120 whereby the contents of the appropriate YE or YO-Register, the one containing the address of the indirect word, are gated via the AND-gate 120 to the YS adder 42. A suitable Address Incrementing Logic 174 will, during PR time, look at the contents of the Address Register 62 to determine if the character or byte count as it is contained in that register is such as to require an incrementation of the indirect word address. It should be remembered that the Address Register 62 is now storing the modified tally and tag portions of the indirect word. Therefore, if bit 12 of the Address Register, corresponding to bit 30 of the indirect word, is a zero thus indicating that the processor is operating in the six bit mode, and the last three bits of the Address Register, corresponding to bits 33–35 of the indirect word, indicates a six, then the Address Incrementing Logic 174 provides a signal via a line 176 which gates the $+1/YS_{17}$ block 173 to the YS adder to thus add one to the contents of the YS adder 42. At this particular time the contents of the YS adder are the original address of the indirect word and this address is, therefore, incremented by one. Similarly, if bit 12 of the Address Register is a binary 1 indicating that the processor is working in the nine bit mode, and the bits 15–17 correspond to a four, then the $+1/YS_{17}$ block 173 is again actuated to increase the address of the YS added by one.

Near the end of PR time, the $DP signal is generated (FIGURE 4). In rsponse to this signal, as is shown in FIGURE 16, the contents of the YS adder 42 are gated via an AND-gate 176 and the DO switch 63 onto the first eighteen lines of the data out bus 65. In response to the same $DP signal, the contents of the Address Register 62, the modified taly and tag portions of the indirect word, are gated via an AND-gate 178 to the last eighteen lines (18–35) of the data out bus 65. This is the rewrite portion of a read/alter/rewrite memory cycle and results in the placing of the modified indirect word into the memory unit.

Upon completion of the storage of the modified indirect word, the memory unit will send a $DA signal to the processor. This $DA signal will reset the PR flip-flop and set the PT flip-flop. During PT time the original address of the indirect word, which has been maintained in the YE or YO-Register, will be utilized to fetch the operand from the memory. This operand will be acted upon in accordance with the operation code of the original instruction word which has been retained in the COE or COO-Register. The byte or character position which will be acted upon is that which was specified by the original indirect word and whose designation has been maintained in the Byte Position Register 268.

$t_d = AD$ (1011) Add Delta.—In the Add Delta variation of IT, an indirect word is obtained from the address contained in the instruction word. The indirect word contains an address, a tally, and a delta (FIGURES 8 and 11). Every time this word is referenced the address will be increased by delta and the tally decreased by one. The modified word is then rewritten into the location from which it was obtained. The operand address will be the address originally contained in the indirect word. When the tally reaches zero, the Tally Runout Indicator will set. The AD modifier permits the orderly progression through a sequence by steps or by groups of words.

Figure 18:
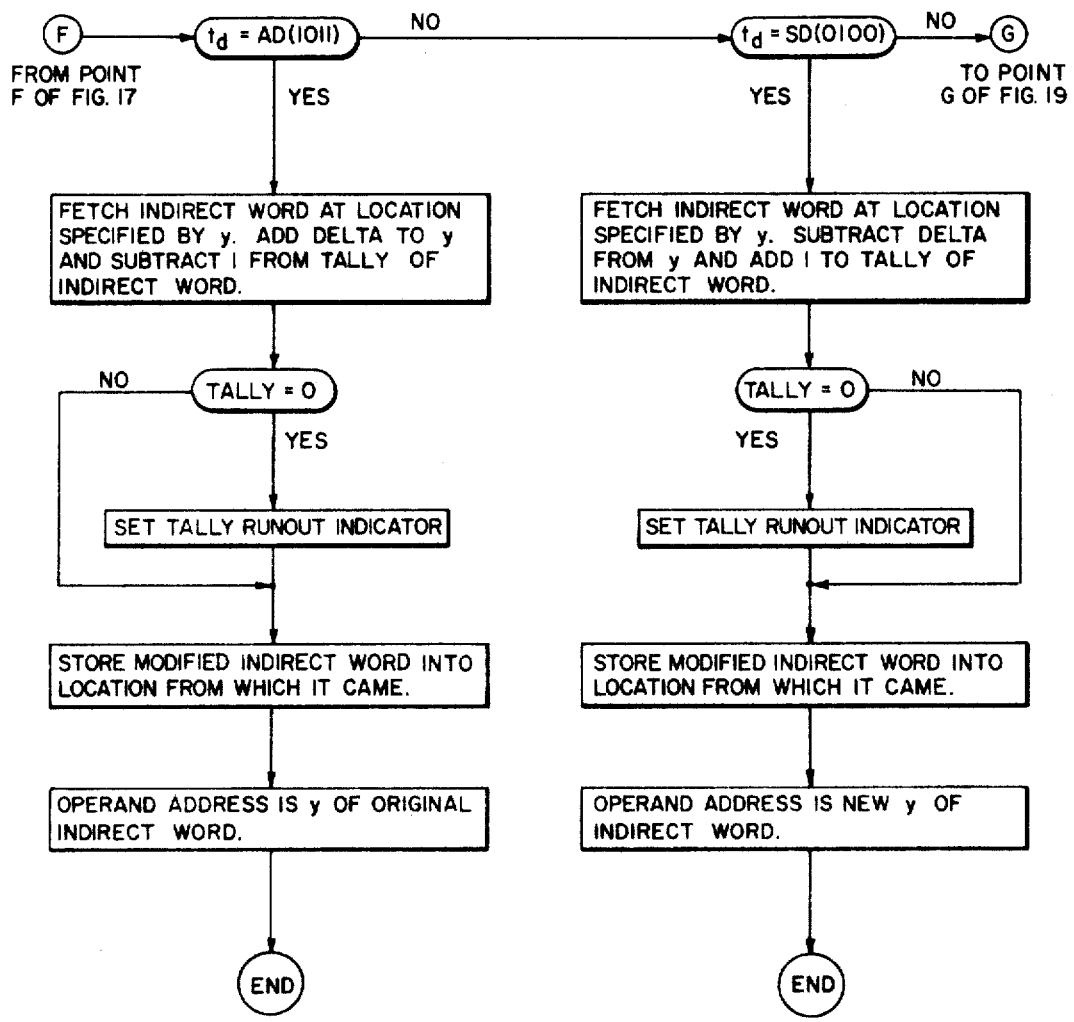
FIGURE 18 is a flow chart useful for describing the AD and SD address modifications.

The manner in which AD modifier operates may best be seen with respect to the FIGURE 16 and the flow chart of FIGURE 18. Referencing now these figures, it is seen that the original word instruction is brought from the appropriate parts of the Instruction Register during PA time in the manner previously described. The tag portion is transferred via the ZI switch 44 to the Tag Decode Logic 52 via AND-gate 118 and to the CT-Register 50 via the AND-gate 124. Because this is a PA time, the address portion of the instruction word is transferred to the Address Register 62 via the ZY switch 38, the AND-gate 120 which is enabled by the output of the OR-gate 121 and the YS adder 42. This address is to be used to obtain an indirect word. Therefore, at the occurence of the signal $ADR, the Address Register 62 will transmit its contents to the memory unit for the accessing and bringing into the processor of the indirect word located at that address. The indirect word is brought to the processor during WN time and at PY time is gated to replace the address and tag (delta) portions of the original instruction word in the Instruction Registers 28. The operation code portion of the original instruction word is maintained in the Instruction Registers without change. During the same PY time the tally and tag (delta) portions of the indirect word will be transferred via the ZDI switch 14, and bus 156 to the ZY switch 38. From the ZY switch the tally and delta will be gated through the AND-gate 158, which has been enabled by the PY signal, to be placed into the YS adder 42. Also during PY time, and in the manner previously discussed, the original tag which was stored in the CT-Register 50 is transferred via the AND-gate 162 to the CT Decode Logic 166. In response to this input from the CT-Register and the input of the PY signal the CT Decode Logic 166 will enable the $-1/ZX_{0-11}$ block 169 to thus transfer the wired contents of this block via the ZX switch 58 to the YS adder 42. The combination of signals thus presented to the YS adder 42 results in decrementing the tally by one. If the tally has reached zero, the Tally Runout Indicator 270 will set in the manner previously described. Inasmuch as this is a PY time, the output of the OR-gate 160 is at a high level thus enabling the AND-gate 158. As such, the contents of the Address Register 62 are the same as those of the YS adder 42. Therefore, at the end of PY time the Address Register will contain the decremented tally and the delta as it appeared in the indirect word.

During PR time, the contents of the appropriate YE or YO-Register (the address portion of the indirect word) are transmitted via the AND-gate 120 to the YS adder 42. Once again the original tag stored in the CT-Register 50 is sent to the CT Decode Logic 166 for decoding. As this is a PR time, the Logic 166 will now decode the original tag to enable the $ADR_{12-17}/ZX_{12-17}$ block 171. Although not directly shown, block 171 serves to gate the last six bits of the contents of the Address Register through the ZX switch 58 to the YS adder 42. Inasmuch as the last six bits of the Address Register are, at this time, the delta of the indirect word, it is seen that delta is added to the address contained in the original indirect word. With the occurrence of a $DP signal, the contents of the Address Register and the YS adder are transmitted to the memory unit via the AND-gates 176 and 178, the DO switch 63 and the bus 65 in a manner identical to the similar transfer which was accomplished to $DP during the SC modifications. The word thus sent to the memory unit contains, with respect to the original indirect word, a tally decremented by one and an address modified by the addition of the delta of that original word. With the receipt of the $DA signal from memory indicating that the word just set via the bus 65 has been stored, the PT flip-flop will set.

With the occurrence now of PT time, the address of the original indirect word which has been maintained in the Instruction Register is transferred via the AND-gate 120 to the YS adder 42. As this is a PT time, the output from the OR-gate 160 will be a high level signal, thus enabling AND-gate 158, and placing this address into the Address Register 62. This address is utilized, at the occurrence of the $ADR signal, to provide a memory access to the operand from the memory unit. This operand is acted upon in accordance with the original operation code which has been maintained throughout this process in the appropriate COE or COO-Register.

$t_d = SD$ (0100) Subtract Delta.—In the Subtract Delta (SD) modification, an indirect word is obtained from the address contained in the instruction word. The indirect word contains an address, a tally and a delta. Every time this word is referenced the address will be decreased by delta and the tally increased by one and this modified word is then rewritten into the memory location from which it was obtained. The operand address is that address developed by the subtracting of the delta. When the tally reaches zero the Tally Runout Indicator will set. Subtract Delta, similarly to Add Delta, allows the walking through a sequence by groups or steps.

Reference is again made to FIGURE 16 and the flow chart of FIGURE 18 for the understanding of the SD modification. The original instruction word is brought from the appropriate Instruction Registers during PA time in the same manner as was done with previous instructions and the tag portion is transferred to the Tag Decode Logic 52 and the CT-Register all as has been previously described. Again, during PA time the address portion of the instruction word is utilized to access the memory and to obtain an indirect word which is brought from the memory to the ZDI switch 14 during WN time. In the following PY time the address and tag portions of the indirect word replace the address and tag portions of the original instruction word in the Instruction Registers. Also at PY time the tally and tag of the indirect word are transferred via the bus 156, the ZY switch 38 and the AND-gate 159 to the YS adder 42 and the Address Register 62. Additionally, the contents of the CT-Register 50 (the tag of the original instruction word) are transferred via AND-gate 162 to the CT Decode Logic 166. Because this is a PY time, this tag is decoded as $+1/ZX_{0-11}$ (block 168) whose wired contents are transferred via the ZX switch 58 to the YS adder 42 to thus increase the tally of the indirect word. Inasmuch as AND-gate 158 is enabled during PY time, this change in the tally in the YS adder is passed on to the contents of the Address Register 62. At this time, therefore, the Address Register contains the incremented tally and the delta of the original indirect word. If the tally thus incremented equals 0, the Tally Runout Indicator 270 will now set. This is the end of PY time and that flip-flop resets and the PR flip-flop sets.

During PR time, the address of the indirect word is brought from the appropriate YE or YO-Register via the ZY switch, the AND-gate 120 to the YS adder 42. The contents of the CT-Register 50 are once again decoded by the CT Decode Logic 166 in accordance with the PR signal input and the thus decoded output of the Logic 166 enables block 172 $\overline{ADR}_{12-17}/ZX_{12-17}$. This block, in essence, represents the transmission of the inversion of the last six bits of the contents of the Address Register to the ZX switch 58 and hence to the YS adder 42. These six bits, as inverted, are the inversion of the delta portion which was being maintained in the Address Register 62. The YS adder now contains the sum of the address in the indirect word and the inversion of the indirect word delta. However, because the adding of the inversion of the six bits from the Address Register will not give a true two's complement, the $+1/YS_{17}$ block 173 is also gated to the YS adder at the same time to provide a true two's complement.

The $DP signal is now generated and the contents (the modified indirect word) of the Address Register and the YS adder are sent via the AND-gates 176 and 178 to the DO switch 63 and from there via bus 65 to the memory unit for storage. This modified indirect word is stored at the location from which the original indirect word was brought.

With the storing of the modified indirect word, the memory unit returns a $DA signal which acts to reset the PR flip-flop and sets the PT flip-flop. As before, the operand is obtained during PT time. In this instance, however, the operand address is the modified address. Therefore, in this situation the PT cycle is substantially identical to the PR cycle up to and including the modification of the address in the YS adder. However, because this is a PT time the output of OR-gate 160 is high, thus enabling AND-gate 158, and this modified address is transferred to the Address Register. Thus with the occurrence of the $ADR signal, the modified address is used for obtaining the operand which is acted upon in accordance with the operation code of the original instruction word.

$t_d$=DI (1100) Decrement Address and Increment Tally.—In the DI modification, an indirect word is obtained from the address contained in the instruction word. The indirect word contains an address and a tally. Every time this word is referenced the address is decreased by one and the tally is increased by one and the word, as modified, is rewritten into the location from which it was obtained. The operand address will be the modified address. When the tally reaches zero, the Tally Runout Indicator will set. The DI modification is best understood with respect to FIGURE 16 and the flow chart of FIGURE 19.

As has been previously described, the address of the original instruction word is used to bring an indirect word into the processor and the tag portion of the original instruction word is stored in the CT-Register 50. This occurs during PA and WN times. In this particular instance the tag portion of the indirect word is not used. Therefore, during PY time the tally is sent via the ZDI switch 14, the ZY switch 38 and the AND-gate 159 to the YS adder 42. Also during the PY time the contents of the CT-Register, which are the tag portion of the original instruction word, are transferred to the CT Decode Logic 166. In this situation, the output of the CT Decode Logic 166 gates the wired contents of the $+1/ZX_{0-11}$ block 168 to the ZX switch 58 and from there to the YS adder 42. Thus the tally of the indirect word is increased by one and this incremented tally is stored in the Address Register 62 via AND-gate 158. As before, if the modified tally=0, the Tally Runout Indicator 270 will set.

With the initiation of PR time, the address contained in the indirect word which has been maintained in the Instructon Registers is transferred via the ZY switch and the AND-gate 120 to the YS adder 42. Again, the contents of the CT-Register 50 are delivered to the CT Decode Logic 166 and, because this is a PR time, the output of the Logic 166 will enable the $-1/ZX_{0-11}$ block 169 and the $-1/ZX_{12-17}$ block 170. The contents of these blocks are transmitted via the ZX switch 58 to the YS adder 42 where they are added to the address located therein to decrement that address by one. Because this is the PR time, it is seen that these YS adder contents are not sent to the Address Register. The $DP signal which now occurs near the end of the PR time cycle effects the transmission of the contents of the Address Register (the incremented tally) and the YS adder (the decremented address) via bus 65 to the memory unit where they are rewritten into the address location from whence the original indirect word was taken.

The PR flip-flop will now reset and the system will enter a PT time with the setting of the PT flip-flop. During PT time of the DI modification, the address contained in the indirect word, which has been maintained in the Instruction Registers is handled in a manner similar to that done in that SD modification. That is, the immediately preceding PR cycle is essentially repeated to the point where the decremented address is developed within the YS adder 42. However, as this is a PT time, the address, once decremented, is transmitted via the AND-gate 158 to the Address Register 62. Upon the occurrence of the $ADR signal, this modified address is sent to the memory unit which returns the operand for action in accordance with the operation code of the original instruction word.

$t_d$=DIC (1101) Decrement Address, Increment Tally and Continue.—In a DIC modification, an indirect word is obtained from the address contained in the instruction word. The indirect word contains an address, tally and a tag. Every time this word is referenced the address is decreased by one and the tally is increased by one, and the thus modified word is written into the memory location from which it was obtained. The tag of the indirect word will be examined and if it calls for another indirect word, this second indirect word will be obtained from the address contained in the indirect word minus one. This will continue until no more indirect words are called for. The address obtained after all modifications are complete will be the operand address. If no further indirect words are called for, the operand address will be the address contained in the indirect word minus one. When the tally reaches zero, the Tally Runout Indicator will set. This type of modification allows the transfersal of a table of pointers to achieve a particular location.

Figure 19:
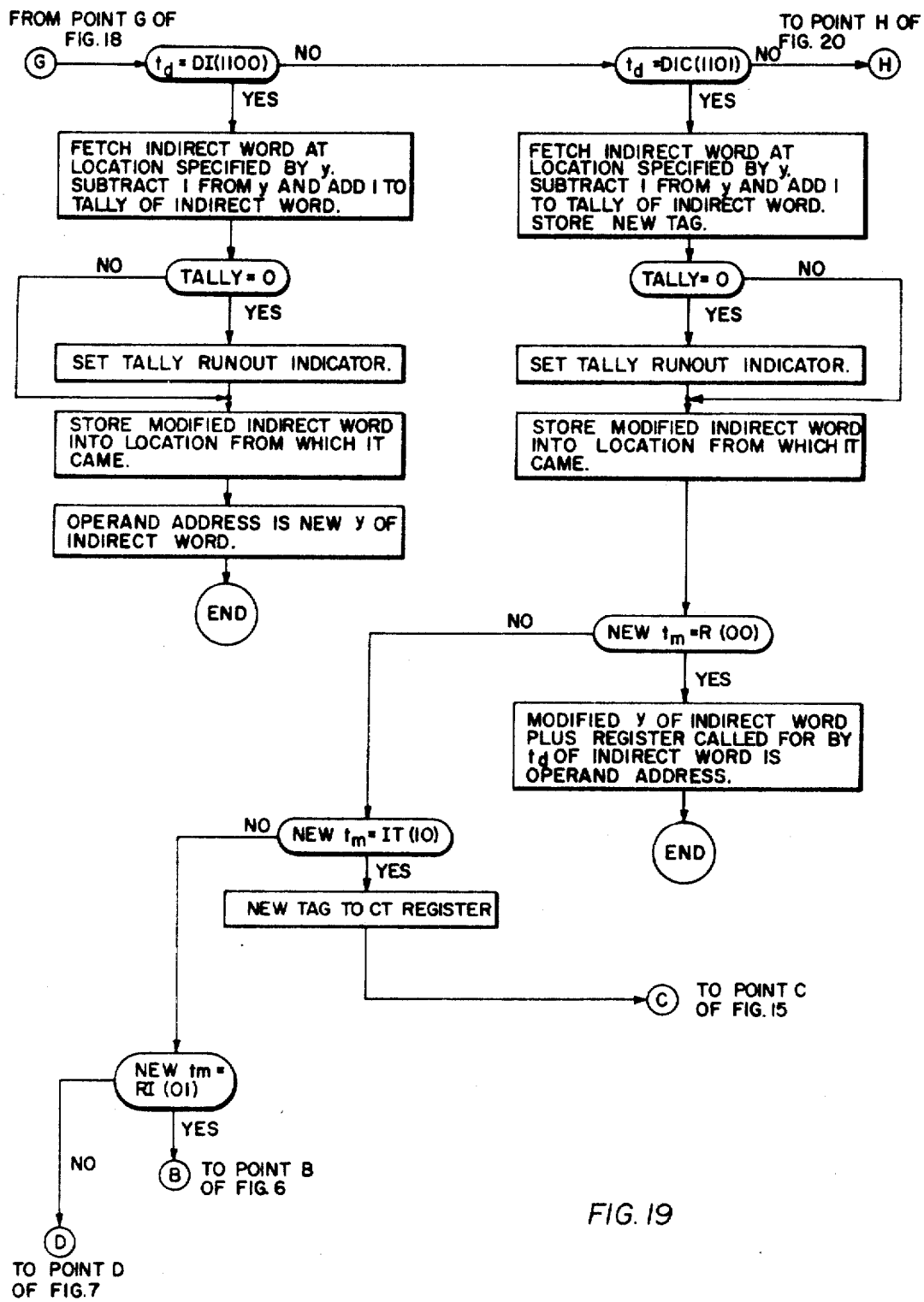
FIGURE 19 is a flow chart useful in the description of the DI and DIC address modifications; and, FIGURE 20 is a flow chart useful in the description of the ID and IDC address modifications.

Again, the operation of the DIC modification may best be understood with reference to FIGURE 16 and the flow chart of FIGURE 19. In this modification, all operations, with one exception, are identical to those performed in the DI operation through the PA, PY and PR times and including the storing of the modified indirect word by $DP signal during PY time.

The one exception mentioned in the previous paragraph concerns the tag of the indirect word. It is noted that in the DI modification there was no tag in the indirect word. In the DIC modification, however, there is a tag in the indirect word and this tag, as was the case in certain earlier explained modifications, is gated into the appropriate COE or COO-Register via an AND-gate 154 during PY time.

During PT time of the DIC modification, the tag portion of the indirect word which has been maintained in the COE or COO-Register is examined. This is shown in FIGURE 16 by the gating of that tag through the ZI switch 44 and the AND-gate 118 which has been enabled by a signal from OR-gate 117 whose output is high because of the input thereto of the signal PT·(IDC=DIC) to the Tag Decode Logic 52. In response to this input, the Tag Decode Logic 52 will provide an R, IR or IT output (FIGURE 3) in accordance with the contents of that tag.

If the $t_m$ portion, bits 30–31, of the indirect word tag is designated an R, then the system will initiate a termination of the address development. In this instance the address contained in the indirect words as it is maintained in the YE or YO-Register is transferred via the ZY switch and the AND-gate 120 to the YS adder. As was the case in the DI modification, the address is decremented by one. The contents of the register specified by the R modifier tag is then added to the decremented address. Upon the occurrence of the $ADR signal, this thereby modified address is the operand address.

If the examination of the tag of the indirect word reveals an IR, the address of the indirect word is decremented as was previously described and this address used to obtain a second indirect word which is located at the location specified by that decremented address. This indirect word is now brought to the ZDI switch 14 of the processor. In addition to directing the fetching of the second indirect word, the tag of the first indirect word is gated into the CT-Register 50. This gating is the function of the output of an OR-gate 125 which enables AND-gate 124. From FIGURE 16 it is seen that the OR-gate 125 is enabled during PT time when a signal designated EA is low. The EA signal is low when the address present in the Address Register is not the address to be used for this manipulation of an operand. The second indirect word of the ZDI switch is now gated into the customary areas of the Instruction Registers 28 and the machine enters an IR modification, as was previously described.

In the case where the tag portion of the first indirect word specified an IT, the decremented address is again utilized to obtain a second indirect word from the memory. As was the case with IR, the tag portion of the original indirect word is again gated into the CT-Register 50. The second indirect word is brought into the Instruction Registers in the customary manner and the machine now enters an IT modification in accordance with the contents of the new tag.

In the case where the tag specifies an RI, the situation varies somewhat. It is similar to that described with respect to IR and IT insofar as the address contained in the indirect word is again modified and utilized to fetch a second indirect word and the new indirect word is placed into the appropriate Instruction Registers. At this point in time the processor enters a PA cycle for the new indirect word and the tag of the new indirect word will be examined. If this new tag is an R, the address development is terminated by decrementing the new address and adding the specified register to obtain the operand address. If the new tag is an IT, the sepcified IT modification is exercised and if it is an IR the system enters an IR modification routine. If the tag is an RI, however, the R portion is ignored and another indirect word is obtained using the address in the indirect word now contained in the YE or YO-Register for the obtaining of still another indirect word. This address is used without modification as was the case of the IT–I modifier. This newest indirect word is placed into the instruction registers and the new tag examined. This cycle will continue so long as the new tags contain an RI and until such time as the tag contains an R to effect a termination or an IR or an IT to effect a transfer to a new chain modification cycle.

$t_d$=ID (1110) Increment Address and Decrement Tally.—In this modification variation, an indirect word will be obtained from the address contained in the instruction word. The indirect word contains an address and a tally. Every time this word is referenced the address is increased by one and the tally is decreased by one and the modified word is written into the location from which the indirect word was obtained. The operand address will be the original address contained in the indirect word. As in all tallying modifications, when the tally reaches zero the Tally Runout Indicator will set.

Figure 20:
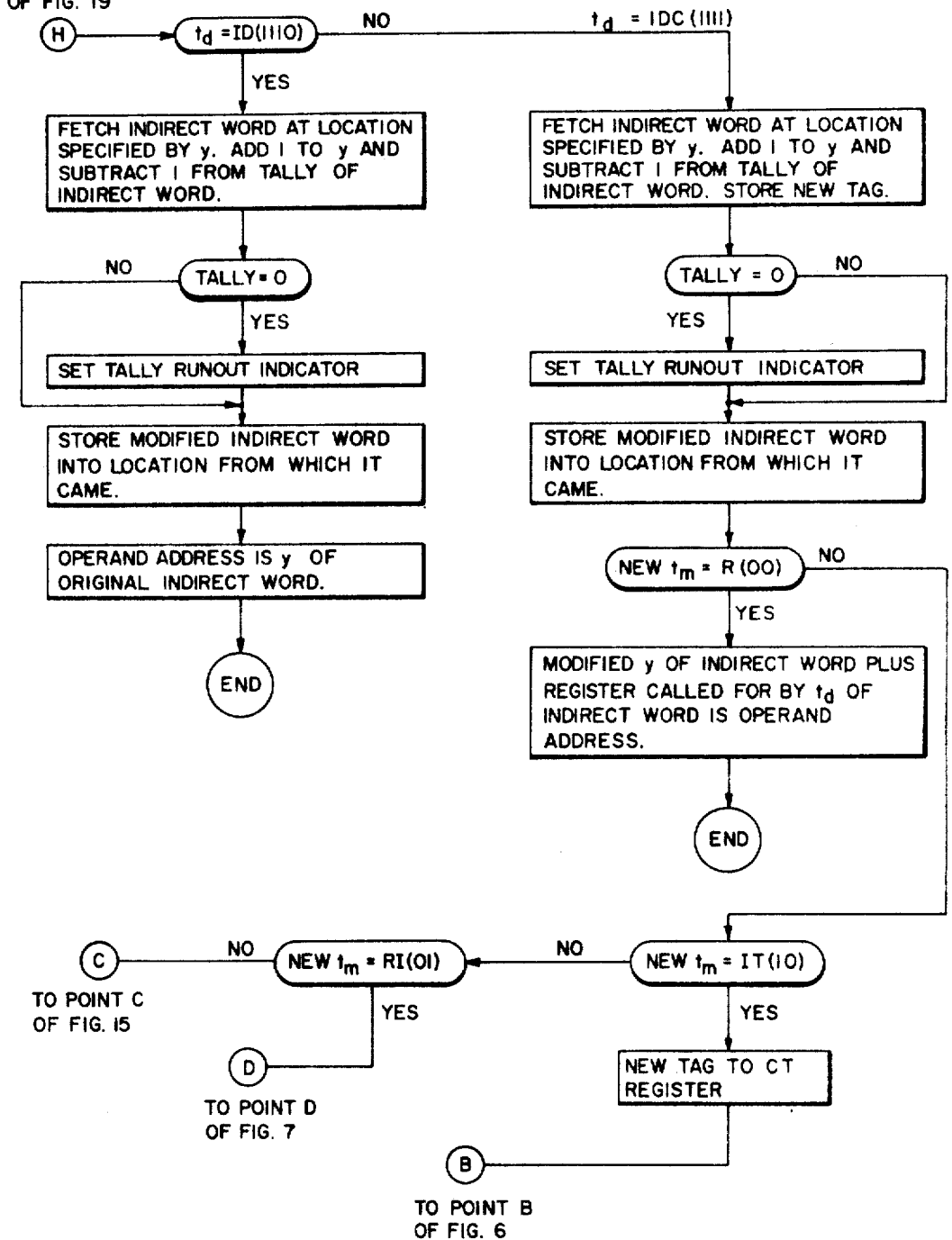

The understanding of this modification may best be realized with respect to the flow chart of FIGURE 20 taken in conjunction with the drawing of FIGURE 16. Referencing these figures, it is seen that the PA portion of the cycle is the same as in all previous cases as is the WN cycle with the bringing of the indirect word to the appropriate Instruction Registers. During PY time the tally is transferred via the ZY switch and the AND-gate 159 to the YS adder 42. With the tally of the indirect word in the YS adder, the tag of the original instruction word as stored in the CT-Register 50 is decoded in the Tag Decode Logic 166. Because this is a PY time, this tag is decoded as the $-1/ZX_{0-11}$ block 169. The contents of this block are transferred via the ZX switch 58 to the YS adder to thus decrement the tally of the indirect word by one. Because it is a PY time AND-gate 158 is enabled, the contents of the YS adder are the contents of the Address Register 62 which latter register serve to store the modified tally after PY time. During PR time, the address of the indirect word is brought via the ZY switch 38 and the AND-gate 120 to the YS adder. The tag portion of the original instruction word is again decoded in accordance with PR time with the result that the $+1/YS_{17}$ block 173 is enabled to thus effect an incrementation of the address contained in the YS adder by one. With the occurrence now of the DP$ signal, the decremented tally of the indirect word is transmitted from the Address Register 62 and the incremented address is transferred to the memory unit via the DO switch 63.

During PT time the original address contained in the indirect word is transferred via the ZY switch 38 and the AND-gate 120 to the YS adder and thence to the Address Register 62. With the occurrence of the $ADR signal at the end of PT, this address is utilized to fetch the operand and bring it to the ZDI switch 14 from the memory unit.

It should be specifically noted that reference is repeatedly made to the fetching or bringing of an operand from the memory. It is to be expressly understood that this is only a representative action and in the case of a store type command the operand address formulated will be the memory location into which the operand is stored.

$t_d$=IDC (1111) Increment Address, Decrement Tally and Continue.—In the IDC modification an indirect word will be obtained from the address contained in the instruction word. The indirect word contains an address, a tally and a tag. Every time this word is referenced the address is increased by one and tally decreased by one and the modified word is written into the memory location from which it was obtained. The tag will be examined and if it calls for another indirect word, it will be obtained from the original address contained in the indirect word. This will continue until no more indirect words are called for. The address obtained after all modifications are complete will be the operand address. If no further indirect words are called for the operand address will be the original address contained in the indirect word. When the tally reaches zero, the Tally Runout Indicator will set.

In the performance of the IDC variation, all steps taken with respect to the ID modification up to the end of the PR time period, including the writing of the updated indirect word into memory with the $DP pulse, are identical to that of ID. In addition, because the indirect word here obtained has a tag, the tag of the indirect word is written into the Instruction Registers. This places the system at the beginning of the PT cycle of an IDC modification. Similarly to the operation in this DIC variations, the tag portion of the indirect word is transferred via AND-gate 118 to the Tag Decode Logic 52. If this tag calls for an R type modification, an address development termination is achieved. Termination as the term is here used means that an operand address is obtained by adding the register designated by the tag of the indirect word to the address contained in the indirect word as this address is modified. This operation is done in the manner of a standard R modification.

In the case of a tag containing an IR modifier the basic operation is identical to that done at this time under a DIC modification. That is, the indirect word is obtained by use of the address contained in the previous indirect word without modification. The IR tag is placed into the CT-Register at this time, and an IR sequence is now entered with the indirect word which is brought from memory.

In the case of the indirect word tag designating an IT, a new indirect word is once more obtained by using the address contained in the original indirect word without modification. Also during this time the tag portion of the indirect word is stored in the CT-Register 50. The system now enters an IT type of modification using the new indirect word which was thusly obtained.

In the case of RI the new indirect word is once again obtained from the address of the original indirect word without modification. However, the new tag is not gated into the CT-Register 50 and the old IT tag is retained in that register. This is illustrated in FIGURE 16 in that the IR+IT will be false (i.e., a binary 0). The new indirect word is now examined and if its tag is an R, an IR or an IT the corresponding type of modification cycle is entered. If the new tag contains an RI, however, the R will once again be ignored and another indirect word obtained using the address in the previous indirect word without modification. This fetching of indirect words will continue until one is found which has a tag containing other than an RI modifier. When such an indirect word is found the designated type of modification will take place to obtain an operand address.

Thus it is seen that there has been shown and described a system of address development or modification which alleviates the necessity of a programmer utilizing an impure procedure and which greatly facilitates the use of a single data processing system in a multiprocessor environment.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a data processing system, the combination comprising: a memory unit having a plurality of addressable storage locations each containing an information item, certain of said information items each consisting of an instruction word containing an address portion, an operation code portion, and a tag portion, certain other of said information items each consisting of an indirect word containing an address portion and a tag portion specifying a portion of an information item; means for retrieving an instruction word from said memory unit; means responsive to the address and tag portions of said instruction word for retrieving an indirect word from said memory unit; and means responsive to said instruction word and said indirect word to provide a subsequent accessing of the memory unit storage location specified by the address portion of said indirect word to thereby permit the performance of an operation on that portion of an information item specified by the tag portion of the indirect word.

2. In a data processing system, the combination comprising: a memory unit having a plurality of addressable storage locations each containing an information item, certain of said information items each constituting an instruction word containing an address portion, an operation code portion, and a tag portion, certain other of said information items each constituting an indirect word containing an address portion and a tag portion specifying a portion of an information item; means for retrieving an instruction word from said memory unit; means responsive to the address and tag portions of said instruction word for retrieving an indirect word from said memory unit; and means responsive to said instruction word and said indirect word to provide a subsequent accessing of said memory unit at the location specified by the address portion of said indirect word to thereby permit the performance of an operation on that portion of an information item specified by the tag portion of the indirect word and in accordance with the operation code portion of said instruction word.

3. In a data processing system, the combination comprising: a memory unit having a plurality of addressable storage locations each containing an information item, certain of said information items each comprising an instruction word containing an address portion defining a storage location, an operation code portion defining an operation to be performed with respect to an information item, and a tag portion defining a modification function, certain other of said information items each comprising an indirect word, each of said indirect words containing an address portion defining a storage location and a tag portion defining a portion of an information item; means for retrieving an instruction word from said memory unit; means responsive to the address and tag portions of said instruction word for retrieving an indirect word from said memory unit; and means responsive to said instruction and indirect words to provide a subsequent accessing of the memory unit storage location specified by the address portion of said indirect word to thereby permit the performance of an operation on that portion of an information item specified by the tag portion of said indirect word.

4. In a data processing system, the combination comprising: a memory unit having a plurality of addressable storage locations each containing an information item, certain of said information items constituting an instruction word each containing an address portion defining a storage location, an operation code portion defining an operation to be performed with respect to an information item, and a tag portion defining a modification function, certain other of said information items constituting indirect words, each of said indirect words containing an address portion defining a storage location and a tag portion defining a portion of an information items; means for retrieving an instruction word from said memory unit; means responsive to the address and tag portions of said instruction word for retrieving an indirect word from said memory unit; and means responsive to said instruction word and said indirect word to provide a subsequent accessing of said memory unit at the location specified by the address portion of said indirect word to thereby permit the performance of an operation on that portion of an information item specified by the tag portion of the indirect word and in accordance with the operation code portion of said instruction word.

5. In a data processing system, the combination comprising: a memory unit having a plurality of addressable storage locations, each of said memory locations containing an information item, certain of said information items each comprising an instruction word containing an address portion, an operation code portion, and a tag portion, certain other of said information items each comprising an indirect word containing an address portion and a tag portion defining a character size and position within an information item; means for retrieving an instruction word from said memory unit; means responsive to the address and tag portions of said instruction word for retrieving an indirect word from said memory unit; and means responsive to said indirect word to provide a subsequent accessing of said memory unit at the location specified by the address portion of said indirect word to thereby permit the performance of an operation on that portion of an information item as is specified by the tag portion of the indirect word.

6. In a data processing system, the combination comprising: a memory unit having a plurality of addressable storage locations, each of said memory locations containing an information item, certain of said information items comprising instruction words, each of said instruction words containing an address portion defining one of said addressable storage locations, an operation code portion defining an operation to be performed with respect to an information item, and a tag portion defining a modification function, certain other of said instruction items comprising indirect words, each of said indirect words containing an address portion defining one of said addressable storage locations and a tag portion defining a character size and position within an information item; means for retrieving an instruction word from said memory unit; means responsive to the address and tag portions of said instruction word for retrieving an indirect word from said memory unit; and means responsive to said indirect word to provide a subsequent accessing of said memory unit at the location specified by the address portion of said indirect word to thereby permit the performance of an operation on that portion of an information item as is specified by the tag portion of said indirect word and in accordance with the operation code portion of said instruction word.

7. In a data processing system, the combination comprising: a data processing unit; a memory unit having a plurality of addressable storage locations containing information items, certain of said information items comprising instruction words, each of said instruction words including an address portion, an operation code portion, and a tag portion, certain other of said information items comprising indirect words, each of said indirect words including an address portion and a tag portion specifying a portion of an information item; means for bringing an instruction word from said memory unit to said data processing unit; means responsive to the address and tag portions of said instruction word for bringing an indirect word from said memory unit to said data processing unit; and means responsive to the address portion of said indirect word to provide a subsequent accessing of said memory unit to bring the information item located at the location specified by the address portion of said indirect word to said data processing unit whereby an operation defined by the operation code portion of said instruction word may be performed on that portion of said information item specified by the tag portion of the indirect word.

8. In a data processing system, the combination comprising: a data processing unit; a memory unit having a plurality of addressable storage locations containing information items, certain of said information items comprising instruction words, each of said instruction words including an address portion defining one of said addressable storage locations, an operation code portion defining an operation to be performed with respect to an information item, and a tag portion defining a modification function, certain other of said information items comprising indirect words, each of said indirect words including an address portion defining one of said addressable storage locations and a tag portion defining a character size and position within an information item; means for bringing an instruction word from said memory unit to said data processing unit; means responsive to the address and tag portions of said instruction word for bringing an indirect word from said memory unit to said data processing unit; and means responsive to the address portion of said indirect word to provide a subsequent accessing of said memory unit at the location specified by the address portion of said indirect word to thereby permit the performance of the operation defined by the operation code portion of said instruction word upon that portion of said information item specified by the tag portion of said indirect word.

9. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other of said information items comprising indirect words, each of said indirect words containing an address portion specifying a particular one of said storage locations and a tag portion, said tag portion defining a byte size and position location within an information item; means for bringing an instruction word to said data processing unit from said memory unit; means responsive to the address and tag portions of said instruction word for bringing the indirect word specified by the address portion of said instruction word from said memory unit to said data processing unit; and means responsive to the address portion of said indirect word to provide a subsequent accessing of said memory unit at the location specified by the address portion of said indirect word, said subsequent accessing involving a portion of an information item as specified by the tag portion of said indirect word, said portion being acted upon in accordance with the operation code portion of said instruction word.

10. A data processing system of the type including a memory unit having a plurality of selectively addressable storage locations each containing an information item, a data processing unit for acting upon selected ones of said information items, and means interconnecting said memory and data processing units whereby selected ones of said information items can be transferred therebetween, the improvement comprising: certain of said instruction items each constituting an instruction word containing an address portion, an operation code portion, and a tag portion; certain other of said information items each constituting an indirect word containing an address portion and a tag portion specifying a portion of an information item; means for retrieving an instruction word from said memory unit; means responsive to the address and tag portions of said instruction word for retrieving an indirect word from said memory unit; means responsive to said instruction word and an indirect word to provide a subsequent accessing of said memory unit at the location specified by the address portion of said indirect word to thereby permit the performance of an operation on that portion of an information item specified by the tag portion of the indirect word in accordance with the operation code portion of said instruction word.

11. A data processing system of the type including a memory unit having a plurality of selectively addressable storage locations each containing an information item, a data processing unit for acting upon selected ones of said information items, and means interconnecting said memory and data processing units whereby selected ones of said information items can be transferred therebetween, the improvement comprising: certain of said information items each constituting an instruction word including an address portion, an operation code portion and a tag portion; certain other of said information items each constituting an indirect word including an address portion and a tag portion specifying a portion of an information item; means for bringing an instruction word from said memory unit to said data processing unit; means responsive to the address and tag portions of said instruction word for bringing an indirect word from said memory unit to said data processing unit; and means responsive to the address portion of said indirect word to provide a subsequent accessing of said memory unit at the location specified by the address portion of said indirect word to thereby permit the performance of the operation defined by the operation code portion of said instruction word upon that portion of said information item specified by the tag portion of said indirect word.

12. A data processing system of the type including a memory unit having a plurality of selectively addressable storage locations each containing an information item, a data processing unit for acting upon selected ones of said information items, and means interconnecting said memory and data processing unit whereby selected ones of said information items can be transferred therebetween, the improvement comprising: certain of said information items comprising instruction words, each of said instruction words containing an address portion specifying a particular one of said storage locations, an operation code portion defining an operation to be performed upon an information item, and a tag portion defining an address modification type, certain other of said information items comprising indirect words, each of said indirect words containing an address portion specifying a particular one of said storage locations and a tag portion defining a byte size and position location within an information item; means for bringing an instruction word to said data processing unit from said memory unit; means responsive to the address and tag portions of said instruction word for bringing the indirect word specified by the address portion of said instruction word from said memory unit to said data processing unit; and means responsive to the address portion of said indirect word to provide a subsequent accessing of said memory unit at the location specified by the address portion of said indirect word, said subsequent accessing involving a portion of an information item as specified by the tag portion of said indirect word, said portion being acted upon in accordance with the operation code portion of said instruction word.

No references cited.

PAUL J. HENON, *Primary Examiner.*

I. S. KAVRUKOV, *Assistant Examiner.*